(12) United States Patent
Shiratori

(10) Patent No.: US 6,265,062 B1
(45) Date of Patent: Jul. 24, 2001

(54) MAGNETIC RECORDING MEDIUM CAPABLE OF REPRODUCING INFORMATION BY DISPLACING MAGNETIC WALL AND RECORDING-REPRODUCING METHOD THEREFOR

(75) Inventor: Tsutomu Shiratori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/933,091

(22) Filed: Sep. 18, 1997

(30) Foreign Application Priority Data

Sep. 19, 1996 (JP) .................................................. 8-248399

(51) Int. Cl.$^7$ ....................................................... G11B 5/66
(52) U.S. Cl. .................. 428/332; 428/336; 428/694 ML; 428/694 SC; 428/694 RE; 428/694 MM; 428/694 EC; 428/694 GR; 428/900; 430/270.1; 430/270.11; 430/270.12; 430/270.13; 430/495; 369/13; 369/275.1; 369/283; 369/288
(58) Field of Search .................... 428/694 ML, 694 SC, 428/694 RE, 694 MM, 694 EC, 694 GR, 332, 336, 900; 369/13, 275.1, 283, 288; 430/270.1, 270.11, 270.12, 270.13, 495

(56) References Cited

U.S. PATENT DOCUMENTS 5,418,076    5/1995    Shiratori ........................ 428/694 EC (List continued on next page.)

FOREIGN PATENT DOCUMENTS

0498440A2    8/1992    (EP) .

(List continued on next page.)

Primary Examiner—Leszek Kiliman
(74) Attorney, Agent, or Firm—Fitzpatrick, Cella, Harper & Scinto

(57) ABSTRACT

A magnetic recording medium comprising first, second and third magnetic layers laminated in succession, wherein when (1) the magnetic wall energy density, saturation magnetization, magnetic wall coercivity and film thickness of the first magnetic layer at a temperature T represented by cgs unit system are defined as σ1, Ms1, Hw1 (2) h1, respectively, and the magnetic wall energy density, saturation magnetization, magnetic wall coercivity and film thickness of the third magnetic layer are defined as σ3, Ms3, Hw3 and h3, respectively, (3) the interface magnetic wall energy density between the first magnetic layer and the third magnetic layer is defined as σw13, and (4) the lowest temperature at which σw13 is 0 erg/cm$^2$ is Ts, at least $2Ms1*Hw1 < \sigma w13/h1$ and $2Ms3*Hw3 > \sigma w13/h3$ are satisfied, at room temperature and when a suitable temperature Tp is chosen, within a temperature range greater than the temperature Ts and lower by 10° C. or more than the Curie temperature Tc1 of the first magnetic layer, within a temperature range of about Ts to Tp, $k1(T) < k3(T)$ and $$\int_{Ts}^{Tp} \frac{1}{k1(T)} dT > 0.2 \times 10^{-4}$$

are satisfied,
where $k1(T) = (2Ms1*Hw1 + \sigma w13/h1)/|d\sigma 1/dT|$ $k3(T) = (2Ms3*Hw3 - \sigma w13/h3)/|d\sigma 3/dT|$.

38 Claims, 10 Drawing Sheets

U.S. PATENT DOCUMENTS 5,629,909   5/1997   Shiratori .................................. 369/13
5,648,134 * 7/1997   Shiratori .............................. 428/641

FOREIGN PATENT DOCUMENTS

0618572A2   10/1994   (EP).
0673026A2    9/1995   (EP).
3-93058      4/1991   (JP).
6-290496    10/1994   (JP).

\* cited by examiner ( Pr=1.0mW )

( Pr=1.4mW )

( Pr=1.8mW )

( Pr=2.2mW )

MAGNETIC RECORDING MEDIUM CAPABLE OF REPRODUCING INFORMATION BY DISPLACING MAGNETIC WALL AND RECORDING-REPRODUCING METHOD THEREFOR

BACKGROUND OF THE INVENTION

1. Field of the Invention

This invention relates to a magnetic recording medium in which a magnetic wall is caused to displace to thereby reproduce information and a recording-reproducing method therefor.

2. Related Background Art

Attention is paid to magnetic recording media such as a magnetic recording medium and a magneto-optical recording medium for recording information thereon based on an orientation state of magnetization of a magnetic material and a recording-reproducing apparatus as a high density recording system capable of rewriting. In recent years, a demand has arisen for increasing the recording density of these magnetic recording media to thereby provide recording media of further large capacity.

In the magneto-optical recording system, the heat energy of a semiconductor laser is utilized to write a magnetic domain into magnetic thin film and record information, and the recorded information is read out by the use of the magneto-optical effect. Generally, the linear recording density of an optical recording medium depends greatly on the laser wavelength of a reproducing optical system and the numerical aperture NA of an objective lens. That is, when the laser wavelength λ of the reproducing optical system and the numerical aperture NA of the objective lens are determined, the diameter of a beam waist is determined and therefore, the spatial frequency of a recording pit capable of reproducing a signal is limited to the order of 2NA/λ.

Accordingly, to realize higher density in a conventional optical disc, it is necessary to shorten the laser wavelength of the reproducing optical system or make the numerical aperture of the objective lens great. However, it is not easy due to the problems of the efficiency, heat generation, etc. of the element to shorten the laser wavelength, and if the numerical aperture of the objective lens is made great, the problem will arise that the depth of focus becomes shallow and the requirement for mechanical accuracy becomes severe.

Therefore, various so-called super-resolving techniques for contriving the construction of the recording medium and the reproducing method and improving the recording density without changing the laser wavelength and the numerical aperture of the objective lens have been developed.

For example, Japanese Laid-Open Patent Application No. 3-93058 proposes a signal reproducing method of effecting signal recording on a recording holding layer of multilayer film comprising a reproducing layer and a recording holding layer magnetically coupled together, uniformizing the direction of magnetization of the reproducing layer, thereafter irradiating the reproducing layer with a laser beam and heating it, and reading a signal recorded on the recording holding layer while transferring the signal to the temperature-increased area of the reproducing layer.

According to this method, relative to the spot diameter of a reproducing laser, an area which is heated by this laser and reaches a transfer temperature and in which a signal is detected can be limited to a smaller area and, therefore, the intersymbol interference during reproduction can be decreased and a signal of a period less than the diffraction limit of light becomes reproducible.

However, the conventional super-resolving system has adopted a method of masking part of the reproducing light, and limiting an aperture for substantially reading a pit to a small area to thereby increase the resolving capability. This has led to the problem that the light of the masked part becomes useless and the reproduction signal amplitude becomes small. That is, the light of the masked part does not contribute to the reproduction signal. Therefore, the more the aperture is narrowed in an attempt to increase the resolving power, the more the light effectively used decreases and the lower becomes the signal level.

In view of such a problem, Japanese Laid-Open Patent Application No. 6-290496 already proposes a method of displacing a magnetic wall present in the boundary portion of a recording mark by a temperature gradient by the use of a special magnetic recording medium, and detecting this displacement of the magnetic wall to thereby reproduce a high density recording signal.

This method, however, is a novel reproducing method entirely differing from the conventional reproducing system and therefore, the detailed conditions thereof have included many unknown portions.

SUMMARY OF THE INVENTION

The present inventor has eagerly repeated investigations about the above-described magnetic recording medium and a reproducing method therefor and, as a result, the inventor has obtained more detailed findings about the property of the material of the recording medium and a reproducing condition therefor. The present invention has as its object to disclose conditions that are more proper for stably realizing the function shown in the above-mentioned Japanese Laid-Open Patent Application No. 6-290496, to thereby provide a magnetic recording medium capable of effecting high density recording and reproduction and a reproducing method therefor.

The above object is achieved by satisfying, in a magnetic recording medium having at least first, second and third magnetic layers laminated in succession, $$2Ms1*Hw1 < \sigma w13/h1$$

and $$2Ms3*Hw3 > \sigma w13/h3$$

at least at room temperature when the magnetic wall energy density, saturation magnetization, magnetic wall coercivity and film thickness of the first magnetic layer at a temperature T represented by cgs unit system are defined as $\sigma s1$, $Hw1$ and $h1$, respectively, the magnetic wall energy density, saturation magnetization, magnetic wall coercivity and film thickness of the third magnetic layer are defined as $\sigma 3$, $Ms3$, $Hw3$ and $h3$, respectively, the interface magnetic wall energy density between the first magnetic layer and the third magnetic layer is defined as $\sigma w13$, and minimum temperature Ts is defined as a temperature at which $\sigma w13$ is 0 erg/cm$^2$, and satisfying $$k1(T) < k3(T)$$

and $$\int_{T_s}^{T_p} \frac{1}{k1(T)} dT > 0.2 \times 10^{-4}$$

within a temperature range of at least Ts to Tp when a suitable temperature Tp is chosen to a temperature range greater than the temperature Ts and lower by 10° C. or more than the Curie temperature Tc1 of the first magnetic layer.

In the foregoing, it is to be understood that $k1(T)=(2Ms1*Hw1+\sigma w13/h1)/|d\sigma 1/dT|$ $k3(T)=(2Ms3*Hw3-\sigma w13/h3)/|d\sigma 3/dT|$.

Also, the above object is achieved by satisfying, in a magnetic recording medium having at least first, second and third magnetic layers laminated in succession, said first magnetic layer being comprised of n constituent layers comprising a layer 11, a layer 12, a layer 1n in succession from the side near said second magnetic layer, $Tc11 < Tc12 < \ldots < Tc1n$ when the interface magnetic wall energy density between said first magnetic layer and said third magnetic layer is defined as $\sigma w13$ and the minimum temperature Ts is defined as a temperature at which $\sigma w13$ is 0 erg/cm², and satisfying $2Ms1*Hw1 < \sigma w13/h1$ and $2Ms3*Hw3 > \sigma w13/h3$ at least at room temperature, and satisfying $k1(T) < k3(T)$ $$\int_{T_s}^{T_p} \frac{1}{k1(T)} dT > 0.2 \times 10^{-4}$$

within a temperature range of at least Ts to Tp when a suitable temperature Tp is chosen to a temperature range greater than the temperature Ts and lower by 10° C. or more than the Curie temperature of said 1n-th constituent layer.

Assuming in the foregoing that in the 1n-the constitutent layer the Curie temperature is Tc1i and the magnetic wall energy density, saturation magnetization, magnetic wall coercivity and film thickness at a temperature T represented by cgs unit system are defined as $\sigma 1i$, $Ms1i$, $Hw1i$ and $h1i$, respectively (where i represents one of integers $1$ to n), $$\sigma 1 = \sum_{i=1}^{n} (\sigma 1i * h1i) \Big/ \sum_{i=1}^{n} h1i$$

$$Ms1 * Hw1 = \sum_{i=1}^{n} (Ms1i * Hw1i * h1i) \Big/ \sum_{i=1}^{n} h1i$$

$$h1 = \sum_{i=1}^{n} h1i$$

and assuming that the magnetic wall energy density, saturation magnetization, magnetic wall coercivity and film thickness of the third magnetic layer are defined as $\sigma 3$, $Ms3$, $Hw3$ and $h3$, respectively, $k1(T)=(2Ms1*Hw1+\sigma w13/h1)/|d\sigma 1/dT|$ $k3(T)=(2Ms3*Hw3-\sigma w13/h3)/|d\sigma 3/dT|$.

Also, the above object is achieved by forming, in a recording method of recording information on the above-described magnetic recording medium, a recording mark corresponding to the information on recording tracks with a width over the full width of the recording tracks.

Further, the above object is achieved by a reproducing method of reproducing information recorded on the above-described magnetic recording medium, including the step of applying a temperature profile on the medium to form a temperature gradient G(T) satisfying $G(T) < k3(T)$, and satisfying $G(T) > k1(T)$ and $$\int_{T_s}^{T_p'} \frac{1}{G(T)} dT > 0.2 \times 10^{-4}$$

within a temperature range of at least Ts to Tp' when a suitable temperature Tp' is chosen to a temperature range greater than the temperature Ts and lower by 10° C. or more than the Curie temperature of said first magnetic layer, and the step of scanning said temperature profile on the surface of the medium, displacing only the magnetic wall in the first magnetic layer toward the high temperature side while keeping the magnetic wall in the third magnetic layer at the moment when the magnetic walls enter a temperature area where the temperature is higher than Ts, and detecting the displacement of this magnetic wall.

7C is a schematic view showing the magnetized state of the magnetic recording medium.

Figure 8:
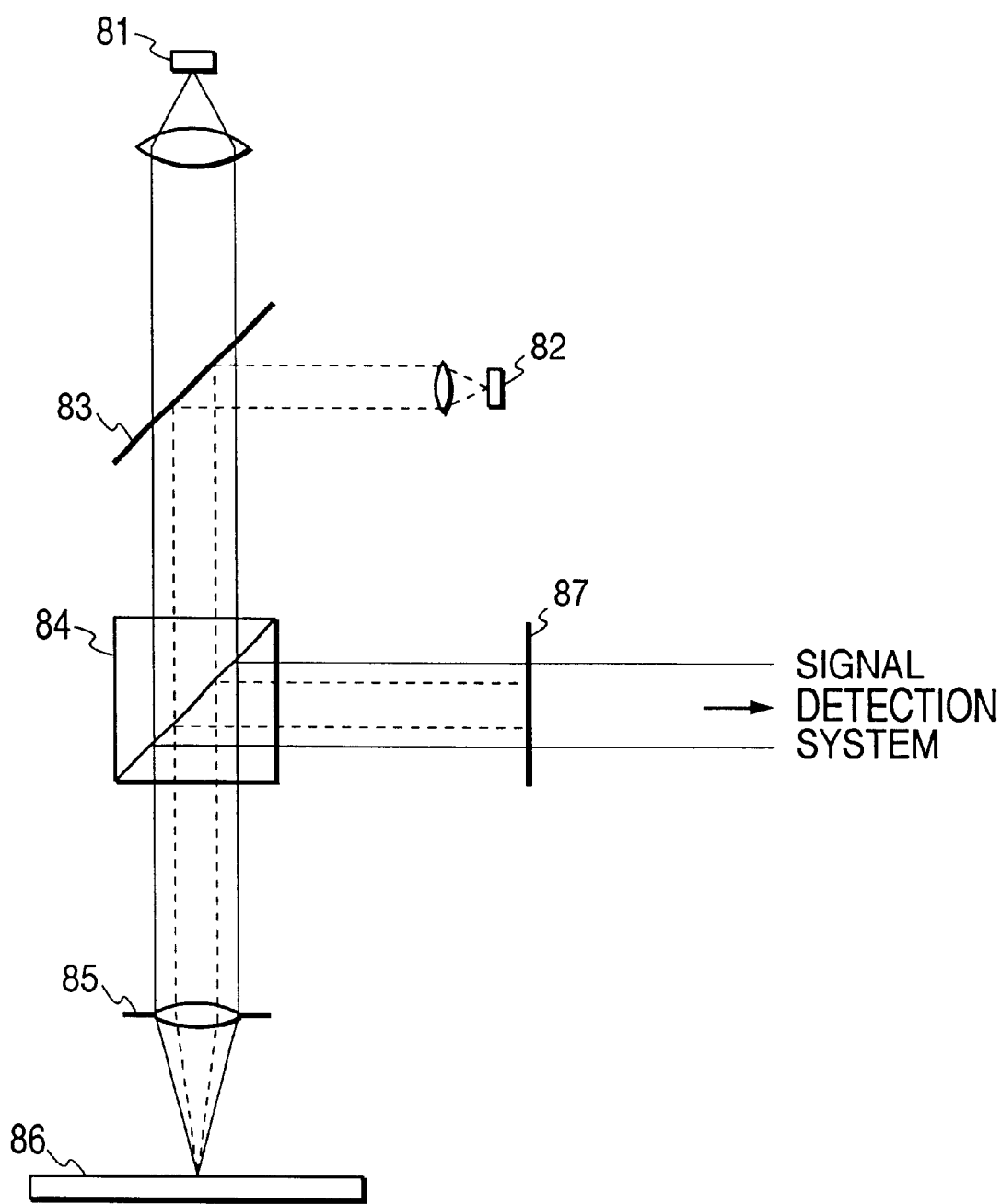

FIG. 8 is a schematic view showing a portion of a recording-reproducing apparatus used in the embodiment.

Figure 9A:
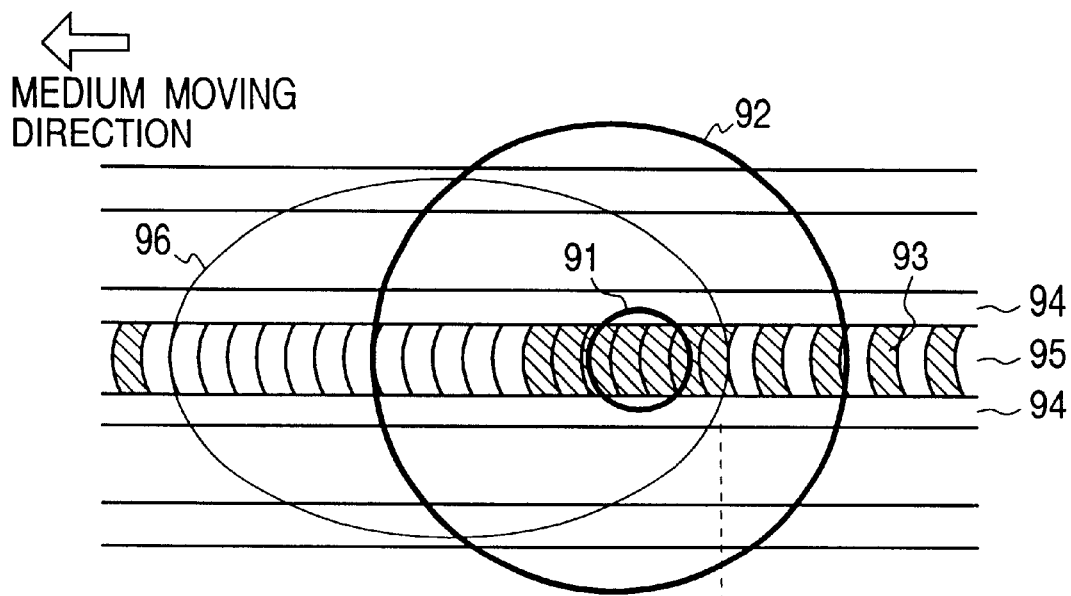
Figure 9B:
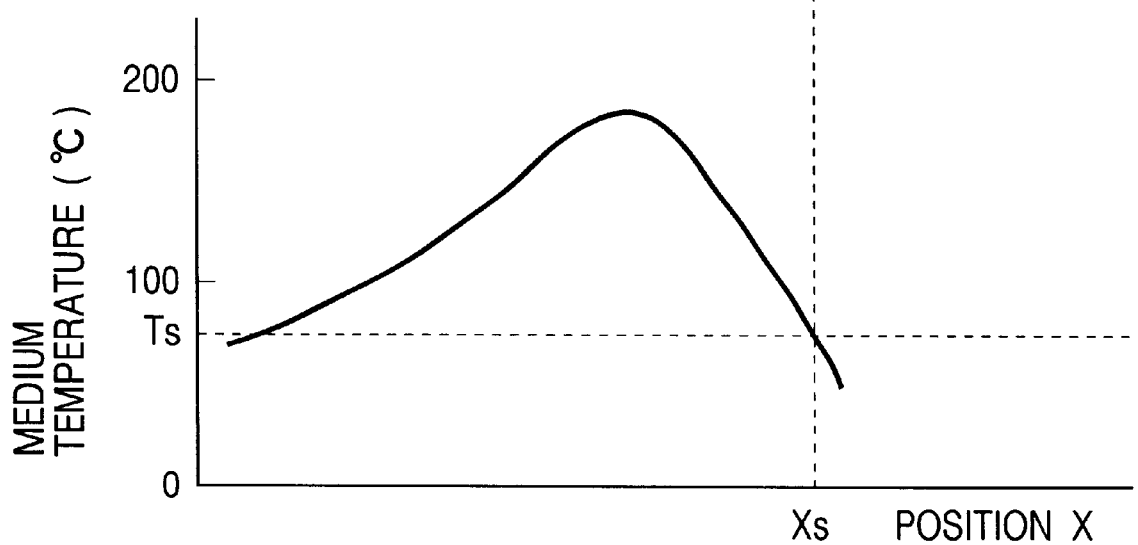

FIGS. 9A and 9B are schematic views showing the reproducing state in the embodiment.

Figure 10:
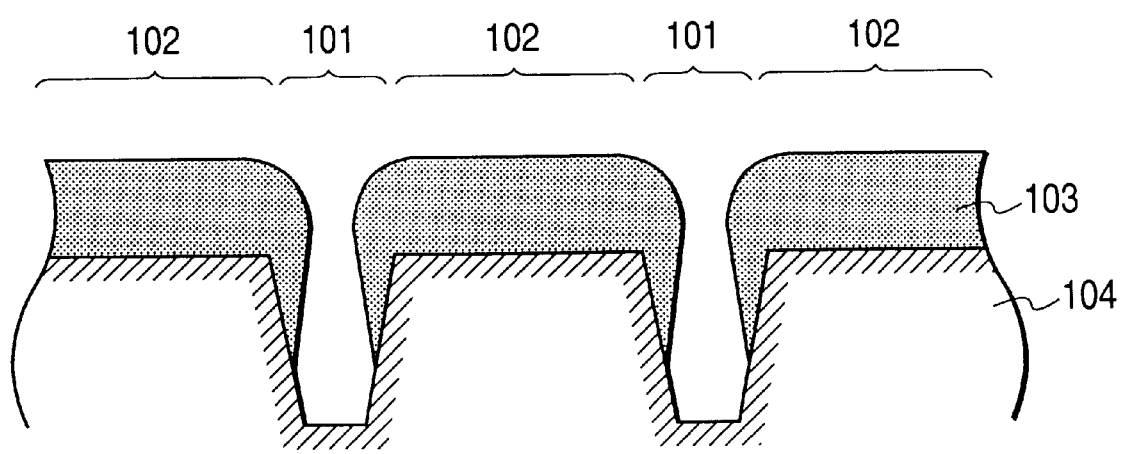

FIG. 10 shows the cross-sectional shape of the magnetic recording medium in the embodiment.

Figure 11:
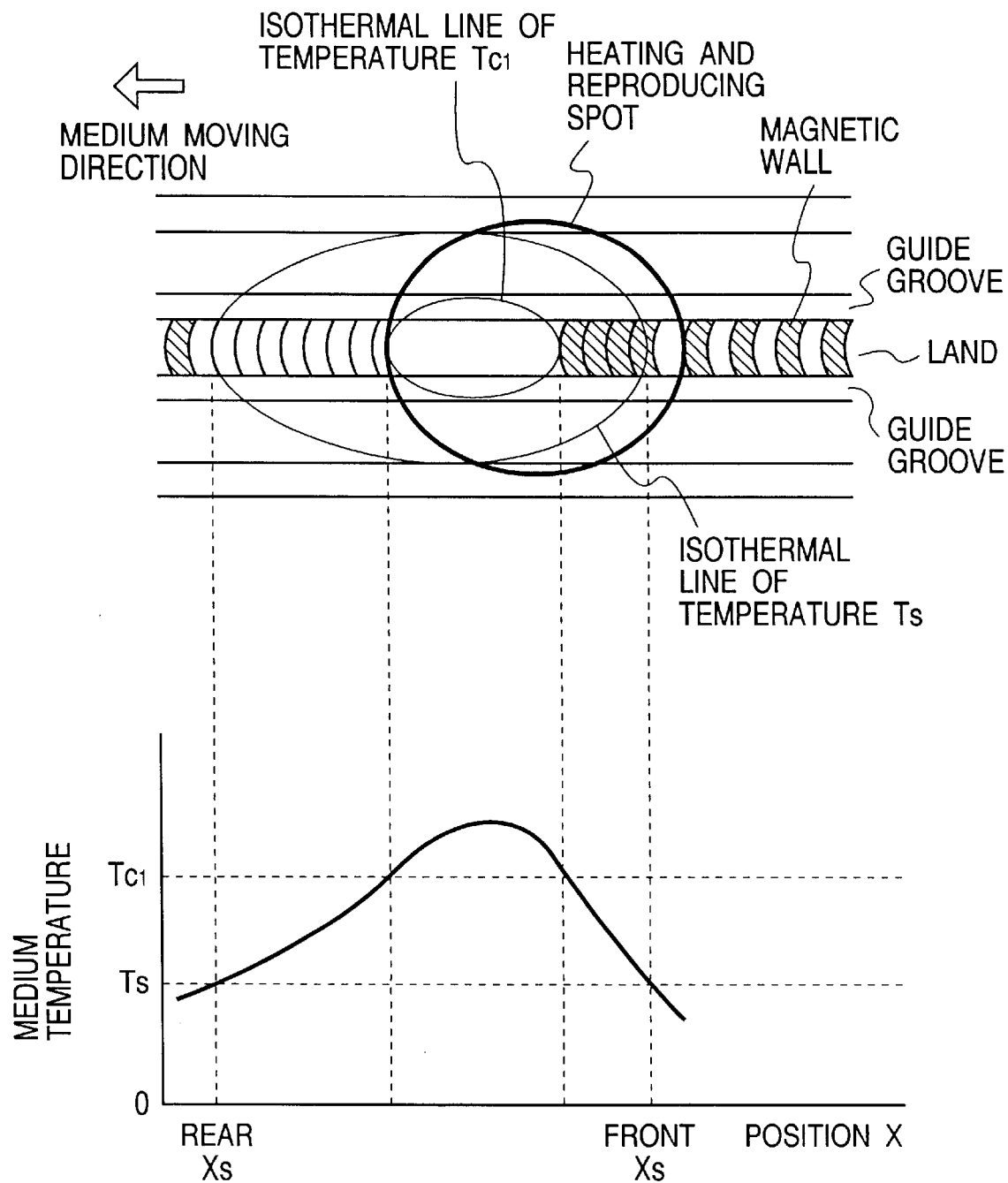

FIG. 11 is a schematic view showing the reproducing state in the embodiment.

FIGS. 12A, 12B, 12C and 12D are schematic views showing reproducing signal waveforms in the embodiment.

DESCRIPTION OF THE PREFERRED EMBODIMENT

Figure 1A:
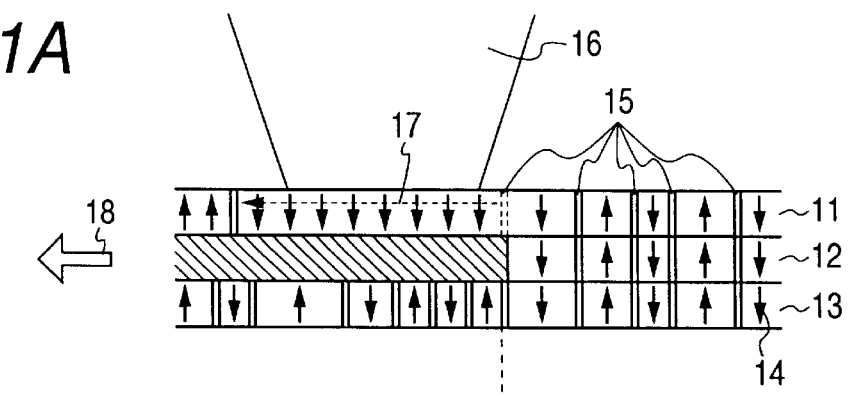
FIGS. 1A, 1B and 1C schematically show the concept of the reproducing method of the present invention when a magnetic recording medium having first, second and third magnetic layers is used, FIG. 1A showing the cross-section of the medium in a reproducing state and schematically showing the oriented state of the spin of each magnetic layer, FIG. 1B showing the temperature profile on the medium at a position shown in FIG. 1A, and FIG. 1C schematically showing the distribution of magnetic wall energy density at a similar position and the distribution of a force acting on the magnetic wall along therewith.
Figure 1B:
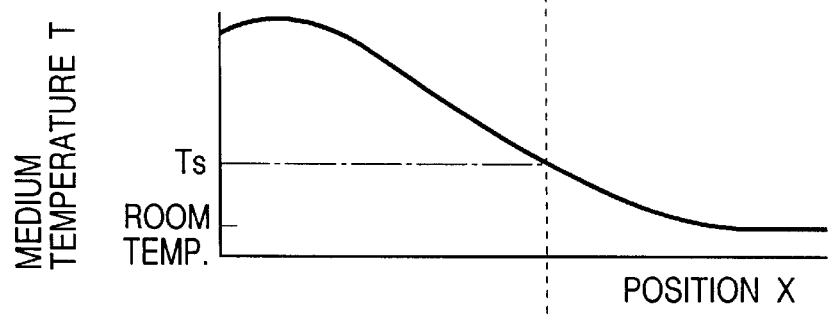
Figure 1C:
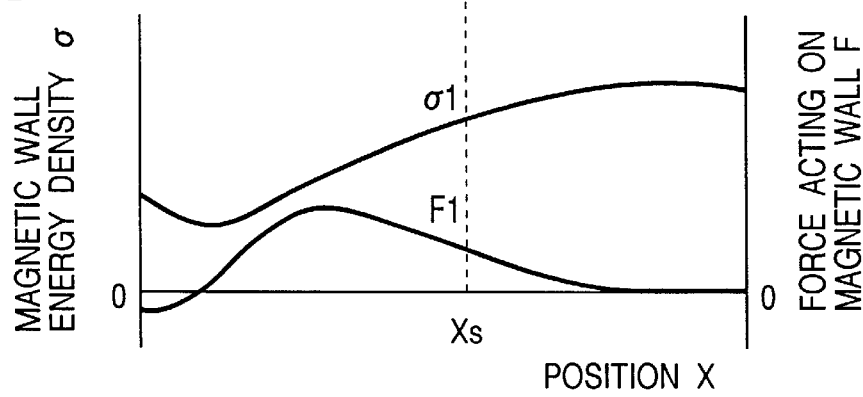

FIGS. 1A to 1C are a schematic view and graphs for illustrating the magnetic recording medium of the present invention and the action in a reproducing method therefor.

FIG. 1A is a schematic cross-sectional view of the magnetic recording medium of the present invention. The magnetic layer of this medium comprises a first magnetic layer 11, a second magnetic layer 12 and a third magnetic layer 13 laminated in succession. The arrow 14 in each layer represents the direction of atomic spin. Magnetic walls 15 are formed in the boundary portions between areas in which the directions of spin are opposite to each other.

FIG. 1B is a graph showing a temperature profile formed in the magnetic recording medium of the present invention. This temperature profile may be one induced on the medium by a light beam itself applied for reproduction, but may desirably be such a temperature profile in which by the use of discrete heating means, the temperature is increased from this side of the spot of the reproducing light beam so that the peak of the temperature may be rearwardly of the spot. At a position Xs, the temperature of the medium reaches Ts, and in an area on the high temperature side from Ts rearward (at the left as viewed in FIG. 1B) of the position Xs, the interface magnetic wall energy density σw13 between the first magnetic layer and the third magnetic layer is 0 erg/cm². This temperature Ts is controlled by adjusting the Curie temperature and film thickness of the second magnetic layer, and generally is a temperature in the vicinity of the Curie temperature of the second magnetic layer.

FIG. 1C is a graph showing the distribution of the magnetic wall energy density σ1 of the first magnetic layer corresponding to the temperature profile of FIG. 1B. When as shown, there is the gradient of the magnetic wall energy density σ1 in X direction, a "magnetic wall driving force" F1 found from the following equation acts on the magnetic wall of the first magnetic layer existing at a position X:

$$F1=|d\sigma1/dX|=|d\sigma1/dT|*|dT/dX| \quad (1)$$

Likewise, when the magnetic wall energy densities of the second and third magnetic layers are defined as σ2 and σ3, respectively, magnetic wall driving forces F2 and F3 found from the following equations also act on the magnetic walls of these magnetic layers:

$$F2=|d\sigma2/dX|=|d\sigma2/dT|*|dT/dX| \quad (2)$$

$$F3=|d\sigma3/dX|=|d\sigma3/dT|*|dT/dX| \quad (3)$$

Here, when the temperature gradient |dT/dX| is represented by G(T) as a function of the temperature at the position X, the temperature profile is formed so as to satisfy $$G(T)<k3(T) \quad (4)$$

and satisfy $$G(T)>k1(T) \quad (5)$$

within a predetermined temperature range of at least Ts or higher. However, assuming that the saturation magnetization, magnetic wall coercivity and film thickness of the first magnetic layer at a temperature T represented by cgs unit system are Ms1, Hw1 and h1, respectively, and the saturation magnetization, magnetic wall coercivity and film thickness of the third magnetic layer are Ms3, Hw3 and h3, respectively, and the interface magnetic wall energy density between the first magnetic layer and the third magnetic layer is σw13, $$k1(T)=(2Ms1*Hw1+\sigma w13/h1)/|d\sigma1/dT| \quad (6)$$

$$k3(T)=(2Ms3*Hw3-\sigma w13/h3)/|d\sigma3/dT| \quad (7)$$

k1(T) is the minimum temperature gradient necessary to displace the magnetic wall of the first magnetic layer, and k3(T) is the maximum temperature gradient at which the magnetic wall of the third magnetic layer can remain undisplaced.

At this time, from equations (1) to (7), $$F3+\sigma w13/h3<2Ms3*Hw3 \quad (8)$$

and within a predetermined temperature range of at least Ts or higher, $$F1>2Ms1*Hw1+\sigma w13/h1 \quad (9)$$

The right side of expression (8) and the first term of the right side of expression (9) are "frictional forces" hindering the displacement of the magnetic wall.

The second term of the left side of expression (8) is a force that the third magnetic layer receives by the exchange interaction with the first magnetic layer, and the second term of the right side of expression (9) is a force that the first magnetic layer receives by the exchange interaction with the third magnetic layer.

From expression (8), the third magnetic layer has its magnetic wall fixed at all times because the frictional force is dominant within any temperature range of the applied temperature profile.

The magnetic wall in the first magnetic layer also remains fixed at the same position as the magnetic wall in the third magnetic layer because in the temperature range below Ts (strictly, a temperature slightly lower than Ts), i.e., the area rearward (right in the figure) of the position Xs, the force the first magnetic layer receives by the exchange interaction with the third magnetic layer (the second term of the right side of expression 9) is great.

However, when the temperature approximates to Ts, the force the first magnetic layer receives by the exchange interaction with the third magnetic layer weakens, and in a predetermined temperature range greater than Ts, the magnetic wall driving force becomes dominant in the first magnetic layer and expression (9) is established, and the magnetic wall in the first magnetic layer displaces toward the high temperature side in which the magnetic wall energy is low.

The second magnetic layer generally reaches its Curie temperature or greater in the temperature range of Ts or greater and therefore, the magnetic wall itself becomes absent.

By satisfying, at least at room temperature, $$2Ms_1 * Hw_1 < \sigma w_{13}/h_1$$

and $$2Ms_3 * Hw_3 > \sigma w_{13}/h_3,$$

the magnetized state preserved in the third magnetic layer is retransferred to the first magnetic layer after it is cooled at least to room temperature, and the preservation and repeated reproduction of information become possible.

For the temperature profile as described above to be able to exist, as the medium condition, it is necessary that $k1(T) < k3(T)$ be satisfied within a predetermined temperature range of at least the temperature Ts or higher.

The first magnetic layer is formed of a material smaller in the magnetic wall coercivity than the third magnetic layer, and the second magnetic layer is formed of a material lower in Curie temperature than the first and third magnetic layers, whereby there can be easily obtained a magnetic recording medium satisfying the above-mentioned condition.

However, an unlimitedly great value cannot be allowed as the value of the temperature gradient $k1(T)$ required for the displacement of the magnetic wall of the first magnetic layer. This is because, if $k1(T)$ is great, a temperature rise is caused up to the Curie temperature of the first magnetic layer simply by slightly displacing the magnetic wall, and the magnetic wall cannot be moved over a distance sufficient to detect.

When the magneto-optical effect is utilized as a method of detecting the displacement of the magnetic wall, the size of the reproducing light beam spot 16 applied is of the order of 1 μm at minimum in the existing ordinary technique and, therefore, it is difficult to detect unless the magnetic wall is displaced over a distance of at least 0.2 μm. (This will not apply in the future, when the technique of forming a more minute light spot is established, or when magnetic induction or the like is utilized as the method of detecting the displacement of the magnetic wall.)

To displace the magnetic wall over a distance of 0.2 μm or more, when a suitable temperature Tp greater than the temperature Ts is chosen, the medium needs to be a medium satisfying $$k1(T) < k3(T)$$

and $$\int_{Ts}^{Tp'} \frac{1}{k1(T)} dT > 0.2 \times 10^{-4}$$

within a temperature range of at least Ts to Tp.

If a temperature profile forming a temperature gradient $G(T)$ satisfying, in addition to the aforementioned condition regarding the temperature profile, $$G(T) > k1(T)$$

and $$\int_{Ts}^{Tp'} \frac{1}{G(T)} dT > 0.2 \times 10^{-4}$$

within a temperature range of at least Ts to Tp' when a suitable temperature Tp' greater than the temperature Ts is chosen is applied to such medium, the magnetic wall will displace over a distance of 0.2 μm or more.

Generally, the more approximate the temperature becomes to the Curie temperature, the easier it becomes to displace the magnetic wall. Therefore, it becomes possible to displace the magnetic wall at a gentle temperature gradient over a long distance. However, the magnetic property weakens at a temperature in the vicinity of Curie temperature and therefore, even if the magnetic wall may be displaced, it is difficult to detect it.

Therefore, it is necessary that the above-mentioned condition be satisfied within a temperature range lower by at least 10° C. than the Curie temperature of the first magnetic layer. To improve the detection level, it is preferable that the above-mentioned condition be satisfied within a temperature range desirably lower by about 20° C., and more desirably lower by about 30° C. or more than the Curie temperature of the first magnetic layer.

Now, when scanning the temperature profile as previously described on the surface of the magnetic recording medium, the displacement of the magnetic wall toward a high temperature area occurs as indicated by broken-line arrow 17. Each time as shown in FIG. 1A, each magnetic wall 15 formed at an interval corresponding to information arrives at a position Xs. By detecting this displacement of the magnetic wall, the information can be reproduced. However, the scanning speed for the temperature profile is made sufficiently low as compared with the speed at which the magnetic wall is displaced.

The isothermal line of the temperature Ts resolves the recording pattern and, therefore, simply by making the displacement distance of the magnetic wall equal to or greater than the size of the readout spot, it is possible to improve the resolving power independently of the size of the reproducing spot, and the resolving power is completely liberated from the limitation of optical diffraction.

While a description has been provided of the magnetic recording medium of the present invention in which the first magnetic layer is comprised of a uniform single layer magnetic film, the first magnetic layer may be comprised of a magnetic layer having such a Curie temperature gradient in the direction of film thickness in which Curie temperature becomes lower toward the second magnetic layer.

That is, the first magnetic layer is comprised of n constituent layers comprising, in succession from the side near the second magnetic layer, an 11th constituent layer, a 12th constituent layer, . . . , a 1n-th constituent layer. The Curie temperature, film thickness, magnetic wall energy density, saturation magnetization and magnetic wall coercivity of the 1i-th constituent layer are defined as $Tc1i$, $h1i$, $\sigma 1i$, $Ms1i$ and $Hw1i$, respectively. In the first magnetic layer, since $Tc11 < Tc12 < \ldots < Tc1n$, exchange-coupling between the constitutent layers is never broken by the constitutent layer that has switched its connection between the constituent layers and has reached the Curie temperature. Accordingly, the first magnetic layer can be regarded as a single magnetic layer as long as a stable coupled state is maintained.

When the magnetic wall energy density, saturation magnetization, magnetic wall coercivity and film thickness of the single magnetic layer are defined as $\sigma 1$, $Ms1$, $Hw1$ and $h1$, respectively, the following equations are established:

$$\sigma 1 = \sum_{i=1}^{n} (\sigma 1i * h1i) \Big/ \sum_{i=1}^{n} h1i$$

$$Ms1 * Hw1 = \sum_{i=1}^{n} (Ms1i * Hw1i * h1i) \Big/ \sum_{i=1}^{n} h1i$$

-continued $$h1 = \sum_{i=1}^{n} h1i$$

The action can hereinafter be described in a manner similar to that when the first magnetic layer is comprised of a uniform single layer magnetic film.

Generally, the more approximate the temperature becomes to the Curie temperature, the magnetic wall driving force becomes dominant to the frictional force. If the first magnetic layer is constructed as described above, the magnetic wall driving force can be made to exceed the frictional force at a temperature sufficiently low relative to the Curie temperature of the 1n-th constituent layer. Therefore, the designing of the medium becomes easy and the operation thereof can be stabilized.

The behavior of the magnetic wall has hitherto been described with respect to the dominant relation among the magnetic driving force created by the gradient of the magnetic wall energy, the frictional force by the magnetic wall coercivity and the exchange interaction between the magnetic layers. However actually, there are the influences of a demagnetizing field and an external magnetic field. Also, when a magnetic domain is surrounded by a closed magnetic wall, the magnetic wall appears or disappears depending on whether the direction of displacement of the magnetic wall is an enlarging direction of the magnetic domain or a reducing direction of the magnetic, domain. Therefore, this affects the behavior of the magnetic wall.

The influences of the demagnetizing field and the external magnetic field can be suppressed by adjusting the saturation magnetization. Also, the influence of the appearance/disappearance of the magnetic wall can be eliminated if the design is made such that the magnetic walls before and behind a recording mark are formed independently of each other. For that purpose, a recording mark can be formed astride both sides of a recording track by the use of a medium in which the exchange coupling between the recording tracks in the first magnetic layer is cut or reduced.

An embodiment to which the present invention is applied will hereinafter be described with reference to the drawings.

Figure 2:
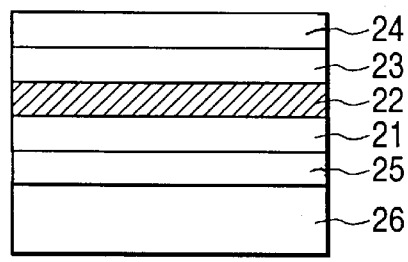
FIG. 2 is a schematic cross-sectional view showing an embodiment of the layer construction of the magnetic recording medium of the present invention.

FIG. 2 is a schematic cross-sectional view showing an embodiment of the layer construction of the magnetic recording medium of the present invention. In this embodiment, an underlayer 25, a first magnetic layer 21, a second magnetic layer 22, a third magnetic layer 23 and an outer layer 24 are successively laminated on a substrate 26. As the substrate 26, use can be made, for example, of polycarbonate, acryl, glass or the like. As the underlayer 25 and the outer layer 24, use can be made of a dielectric material such as SiN, AiN, SiO, ZnS, MgF or TaO. If not for optically detecting the movement of the magnetic wall, the material need not always be a light transmitting material. The other layers than the magnetic layers are not requisite. The order of lamination of the magnetic layers may be reversed. Also, a metallic layer formed of Al, AlTa, TlTi, AlCr, Cu, Pt, Au or the like may be further added to this construction to thereby adjust the thermal characteristic. Also, a protective coat formed of high-molecular resin may be applied, or the substrate may be cemented after the formation of film.

These layers can be formed, for example, by continuous sputtering by a magnetron sputtering apparatus or continuous evaporation. Particularly, the magnetic layers are continuously formed without breaking the vacuum, whereby they are exchange-coupled to each other.

In the above-described medium, the first to third magnetic layers 21–23 can be formed of various magnetic materials such as a magnetic bubble material and an antiferromagnetic material, besides materials usually used for a magnetic recording medium and a magneto-optical recording medium.

They can be formed, for example, of rare earth-iron group amorphous alloys composed of 10–40 atom % of one or two or more of rare earth metal elements such as Pr, Nd, Sm, Eu, Gd, Tb, Dy, Ho and Er, and 90–60 atom % of one or two or more of iron group elements such as Fe, Co and Ni. By "iron group" is meant the elements iron, cobalt, and nickel. Also, in order to improve corrosion resistance, a small quantity of element such as Cr, Mn, Cu, Ti, Al, Si, Pt or In may be added to these alloys. By "platinum group" is meant the elements Ru, Rh, Pd, Os, In, and Pt.

Use can also be made of platinum group-iron group periodic structure film such as Pt/Co or Pd/Co, platinum group-iron group alloy film, an antiferromagnetic material such as Co—NiO or Fe—Rh alloy, or a material such as magnetic garnet.

In the case of heavy rare earth-iron group amorphous alloys, the saturation magnetization can be controlled by the composition ratio between rare earth element and iron group element. If compensation composition is adopted, the saturation magnetization at room temperature can be 0 emu/cc.

Curie temperature can also be controlled by the composition ratio. To control Curie temperature independently of the saturation magnetization, a method of using a material in which part of Fe as an iron group element is replaced by Co to control the amount of replacement can be utilized more preferably. That is, by replacing 1 atom % of Fe by Co, the rise of Curie temperature by the order of 6° C. can be expected and therefore, by the use of this relation, the amount of addition of Co is adjusted so as to provide the desired Curie temperature. It is also possible to reduce the Curie temperature conversely by adding a minute amount of non-magnetic element such as Cr, Ti or Al. The Curie temperature can also be controlled by using two or more kinds of rare earth elements to adjust their composition ratio.

The magnetic wall coercivity and the magnetic wall energy density are controlled chiefly by the selection of material elements, but can also be adjusted by the state of the groundwork or the film forming condition of sputtering gas pressure or the like. Materials of Tb or Dy origin are great in magnetic wall coercivity and magnetic wall energy density, and materials of Gd origin are small in them. They can also be adjusted by the addition of an impurity.

The film thickness can be controlled by the film forming speed and the film forming time.

The recording of a data signal onto the magnetic recording medium of the present invention is effected by making the magnetization oriented state of the third magnetic layer correspond to the data signal by magnetic recording or thermo-magnetic recording. In the thermo-magnetic recording, there is a system of modulating an external magnetic field while moving the medium and applying a laser beam of such power that the third magnetic layer assumes the Curie temperature or a greater temperature, and a system of modulating laser power while applying a magnetic field in a predetermined direction. In the case of the latter, if the intensity of the laser beam is adjusted so that only a predetermined area in the light spot may assume the Curie temperature of the third magnetic layer or a greater temperature, a recording magnetic domain having a diameter smaller than the diameter of the light spot can be formed and a signal of a period greater than the diffraction limit of light can also be recorded.

While the present invention will be described in greater detail with respect to some specific embodiments thereof, the present invention is not restricted to the following embodiments as far as it does not depart from the gist thereof.

[Embodiment 1]

The targets of B-doped Si, and Gd, Tb, Fe, Co and Cr were mounted on a DC magnetron sputtering apparatus, and a polycarbonate substrate formed with a tracking guide groove (guide zone) was fixed to a substrate holder, whereafter the interior of the chamber was evacuated by a cryopump until high vacuum of $1\times10^{-5}$ Pa or less was reached. Ar gas was introduced into the chamber until 0.5 Pa was reached while the chamber remained evacuated, and the targets were sputtered to form each layer while the substrate was rotated.

At first, an SiN layer was formed to 80 nm as a underlayer. Subsequently, a GdFeCr layer as the first magnetic layer was formed to a film thickness (h1) of 30 nm, a TbFeCr layer as the second magnetic layer was formed to a film thickness (h2) of 10 nm, and a TbFeCoCr layer as the third magnetic layer was formed to a film thickness (h3) of 80 nm. Lastly, an SiN layer as a protective layer was formed to 60 nm.

During the formation of the SiN layer, $N_2$ gas was introduced in addition to Ar gas, and the layer was formed by DC reaction sputtering. The magnetic layers had their composition ratio controlled by the ratio of the powers applied to the targets of Gd, Tb, Fe, Co and Cr.

The composition ratio was adjusted so that each magnetic layer might assume a composition in the vicinity of the compensation composition, and was adjusted so that the Curie temperature (Tc1) of the first magnetic layer might be 220° C., the Curie temperature (Tc2) of the second magnetic layer might be 160° C. and the Curie temperature (Tc3) of the third magnetic layer might be of the order of 290° C.

Samples of the same layer construction were made for static characteristic measurement, and the temperature dependency of the interface magnetic wall energy density σw13 between the first magnetic layer and the third magnetic layer was measured. The lowest temperature Ts at which σw13 was 0 erg/cm² was 160° C.(=Tc2).

Next, a sample of a construction was made in which each magnetic layer was a single layer, and the temperature dependency of the saturation magnetization Ms1 and magnetic wall coercivity Hw1 of the first magnetic layer, and the saturation magnetization Ms3 and magnetic wall coecivity Hw3 of the third magnetic layer were measured.

Further, for each magnetic layer, an exchang-coupling two-layer film with a magnetic layer of different polarity was made of the same material, and the magnetic wall energy densities (Bloch magnetic wall energy densities) σ1 and σ3 of the first and third magnetic layers were found from the result of the actual measurement of the interface magnetic wall energy between the two layers.

From the results of the measurement, $$k1(T)=(2*Ms1*Hw1+\sigma w13/h1)/|d\sigma1/dT|$$

and $$k3(T)=(2*Ms3*Hw3-\sigma w13/h3)/|d\sigma3/dT|$$

were derived.

Figure 3:
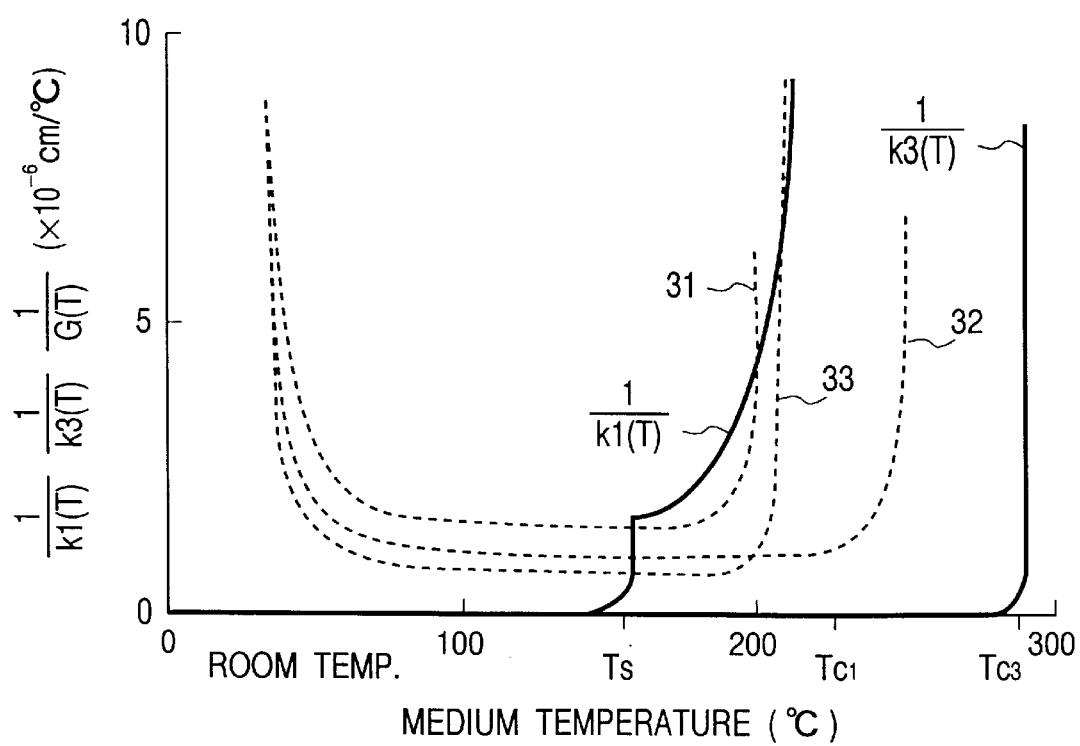
FIG. 3 is a graph showing the temperature dependency of the inverse number of a critical temperature gradient regarding the start of the displacement of the magnetic walls of first and third magnetic layers in the embodiment.

By taking the inverse of these numbers, the temperature dependency of 1/k1(T) and 1/k3(T) is shown in FIG. 3. From FIG. 3, it is seen that when, for example, the temperature Tp is chosen to 200° C., within a temperature range of at least Ts to Tp, $$k1(T) < k3(T)$$

and $$\int_{Ts}^{Tp} \frac{1}{k1(T)} dT > 0.2\times10^{-4}$$

are sufficiently satisfied.

Also, at least at room temperature, $$2Ms1*Hw1 < \sigma w13/h1$$

and $$2Ms3*Hw3 > \sigma w13/h3$$

were satisfied.

That is, the magnetic recording medium of the present embodiment satisfies the conditions of the magnetic recording medium of claim 1.

Now, if a temperature profile is applied to the surface of this medium forming a temperature gradient G(T) satisfying $$G(T) < k3(T)$$

and satisfying $$G(T) > k1(T)$$

and $$\int_{Ts}^{Tp'} \frac{1}{G(T)} dT > 0.2\times10^{-4}$$

within a temperature range of at least Ts to Tp' (when a suitable temperature Tp' (which may be a temperature differing from the above-mentioned Tp) is chosen within a temperature range greater than the temperature Ts and lower by 10° C. or more than the Curie temperature of the first magnetic layer), the magnetic wall present on the isothermal line of the temperature Ts will displace by 0.2 µm or more toward a high temperature area. Moreover, a displacement distance of 0.2 µm or more can be secured within a temperature range lower by 10° C. than the Curie temperature of the first magnetic layer.

The prescription set out at page 5, line 6 to page 6, line 9 of the specification is a necessary condition required of the medium in order that such a temperature profile may be able to exist. Conversely, in the case of a medium satisfying this condition, if an appropriate temperature profile is only given, the above described operation will be realized. However, to secure an operation margin as a recording reproducing system, a medium in which the range of the allowed temperature profile is wide is better.

Figure 4:
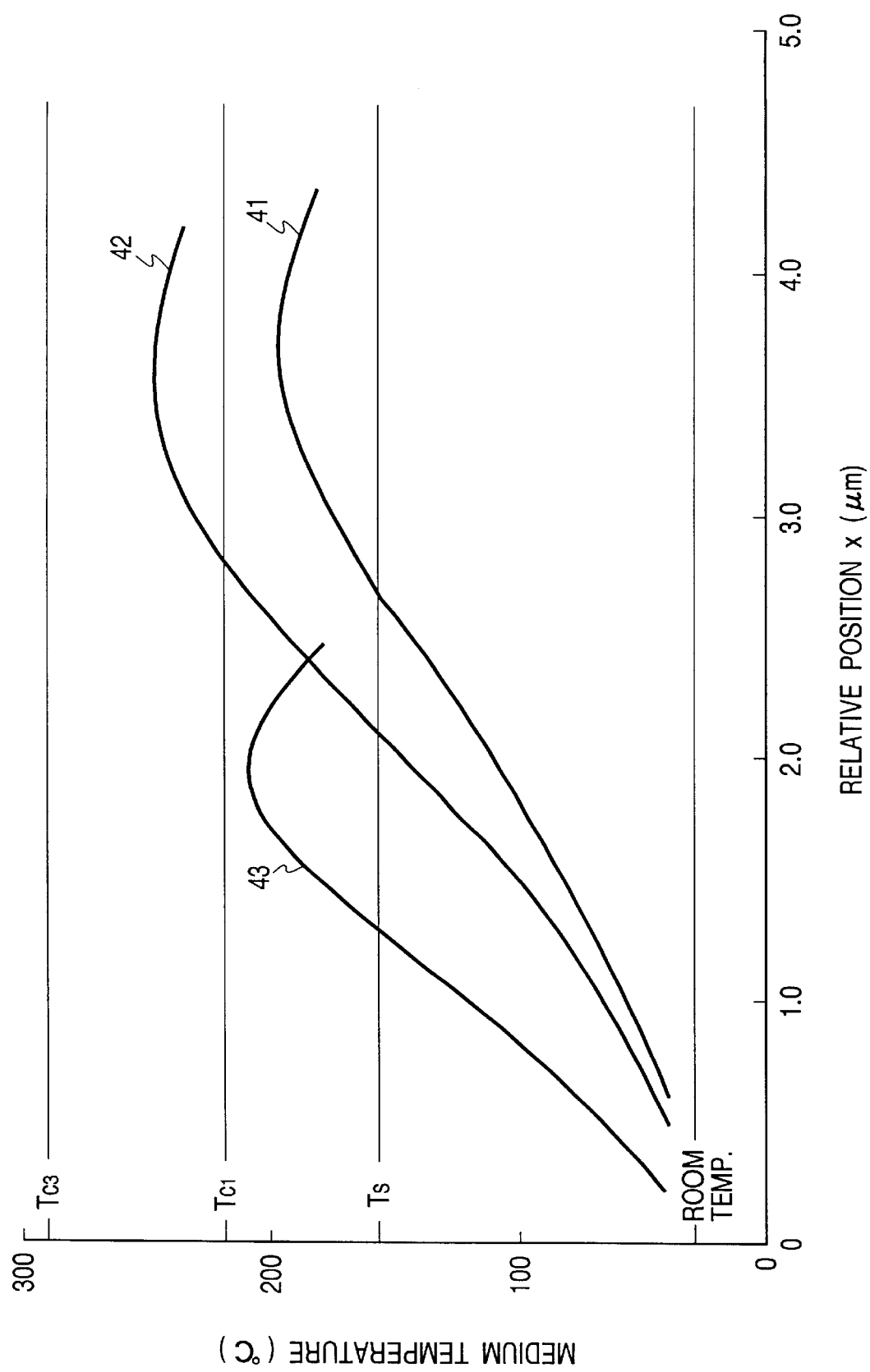
FIG. 4 is a graph showing the temperature profile in the embodiment.

In the magnetic recording medium of the present embodiment, the above-mentioned conditions can be satisfied if temperature profiles as indicated, for example, by 41–43 in FIG. 4 are formed. A temperature gradient of such a level and a temperature profile having a Gaussian-like shape can be easily formed, for example, by the application of a condensed laser beam.

The temperature profiles 41, 42 and 43 in FIG. 4 are re-expressed by a function of the inverse number 1/G(T) of the temperature gradient to the temperature, and are indicated by broken lines 31, 32 and 33, respectively, in FIG. 3. It is seen that these temperature profiles satisfy the above-mentioned conditions.

Herein, an example in which the peak temperature is lower than the Curie temperature of the third magnetic layer is shown. However, if data are read out while being destroyed, reading-out itself will be possible even if a temperature profile has a high temperature area greater than the Curie temperature of the third magnetic layer.

To provide a medium in which the range of allowed temperature profile is wide, it is desirable that $1/k1(T)$ be as great as possible within a predetermined temperature range greater than Ts. Also, it is desirable that the widest possible temperature range be adopted as the temperature range greater than Ts which satisfies $k1(T)<G(T)<k3(T)$. For that purpose, it is desirable that Tc1 and Tc3 be sufficiently higher than Ts.

Specifically, a medium which can satisfy $$\int_{Ts}^{Tp} \frac{1}{k1(T)} dT > 0.4 \times 10^{-4}$$

and more desirably can satisfy $$\int_{Ts}^{Tp} \frac{1}{k1(T)} dT > 0.8 \times 10^{-4}$$

is preferable.

Also, a medium which satisfies Tc1, Tc3>Ts+50° C., and more desirably satisfies Tc1, Tc3>Ts+80° C. is preferable.

To make $1/k1(T)$ great, Ms1*Hw1 can be made small and the temperature dependency of σ1 can be made steep. To make the temperature dependency of σ1 steep, σ1 can be made great, but for that purpose, anisotropy and exchange stiffness need be made great, and this tends to be contrary to the demand for making Ms1*Hw1 small.

So, it is good to make the temperature dependency of σ1 such that the change therein is small within a temperature range below Ts and is sharply reduced within a predetermined temperature range above Ts. For example, if the first magnetic layer is made into composition in which rare earth element sublattice magnetization is dominant at room temperature, the temperature dependency of σ1 can be made such as described above.

Also, to displace the magnetic wall stably and further improve the displacement speed of the magnetic wall and make high-speed reproduction possible, the magnetic wall driving force should desirably be sufficiently great relative to the frictional force. Therefore, it is desirable that $1/G(T)$ of the temperature profile applied be sufficiently smaller than $1/k1(T)$ which is the characteristic value of the medium.

Specifically, it is desirable that $1/G(T)<(½*k1(T))$, and it is more desirable that $1/G(T)<1/(4*k1(T))$. In order that such a temperature profile may be able to exist, a medium is desired which satisfies the necessary condition $$\int_{Ts}^{Tp} \frac{1}{2*k1(T)} dT > 0.2 \times 10^{-4}$$

and more desirably satisfies $$\int_{Ts}^{Tp} \frac{1}{4*k1(T)} dT > 0.2 \times 10^{-4}$$

and when the margin of the aforementioned allowed temperature profile is taken into account, a medium is desired which satisfies $$\int_{Ts}^{Tp} \frac{1}{4*k1(T)} dT > 0.4 \times 10^{-4}$$

and more desirably satisfies $$\int_{Ts}^{Tp} \frac{1}{4*k1(T)} dT > 0.8 \times 10^{-4}.$$

Further, the size of a laser spot for detecting the displacement of the magnetic wall is of the order of 1 μm in the existing ordinary technique. Therefore, to obtain a maximum amplitude by the use of the whole of this spot, it is desirable that 1 μm or more be secured as the movement distance of the magnetic wall. For this purpose, it is desired from each of the above-described points of view that the medium be a medium satisfying an expression in which the value of the right side of each of the above-mentioned expressions is multiplied by 5 times (1 μm/0.2 μm=5).

Also, if the same medium is to be reproduced, when the temperature profile applied is made such that in accordance with the characteristic value of the medium, $G(T)/k1(T)$ becomes as constant as possible within a temperature range above Ts, the magnetic wall can be moved over a long distance while a magnetic wall driving force of a necessary magnitude is maintained. Therefore, a good reproduction characteristic is obtained.

Generally, $1/k1(T)$, which is the physical property value of a medium, as seen in FIG. 3, tends to increase as it approximates the Curie temperature of the first magnetic layer. So, if following this characteristic, $1/G(T)$, which is the applied temperature profile, is suddenly increased with a temperature rise, it will become possible to move the magnetic wall over a relatively long distance while a magnetic wall driving force sufficiently great relative to the frictional force is maintained. The temperature profile in which $1/G(T)$ suddenly increases with a temperature rise refers to a temperature profile in which the temperature gradient suddenly becomes loose when the magnetic wall advances over a slight distance, and becomes such a temperature profile that a Gaussian-like shape is crushed into a trapezoid. It is preferable to adjust the temperature in which the temperature gradient of such a temperature profile becomes steepest to Ts. It is also possible to form such a temperature profile as by the application of a laser beam having a plurality of intensity peaks. Also, even in the case of a temperature profile of an ordinary Gaussian-like shape, when, as indicated by 33 in FIG. 3, the peak temperature is adjusted to a temperature in the vicinity of the Curie temperature of the first magnetic layer, $1/G(T)$ can be made to relatively match the characteristic value $1/k1(T)$ of the medium.

However, magnetism weakens at a temperature in the vicinity of the Curie temperature and therefore, although the magnetic wall may move in this temperature area, it is difficult to detect it. Therefore, it is preferable to provide a medium satisfying Tp<Tc1−20° C., and desirably Tp<Tc−30° C., and it is desirable that the temperature profile applied be such a temperature profile that within a range satisfying Tp'<Tc1−20° C., and desirably Tp'<Tc1−30° C., a movement distance of 0.2 μm or more can be earned. Further, from this sense, it is desirable that Ts be sufficiently lower than Tc1, and it is preferable to provide a medium satisfying Tc1>Ts+70° C., and desirably Tc1>Ts+100° C.

In the magnetic recording medium of the present embodiment, the manner in which the magnetic wall of the first magnetic layer was moved by a temperature gradient could be confirmed by direct observation using a polarization microscope, as will hereinafter be described.

A sample of the same construction as the magnetic recording medium of the present embodiment and in which the order of lamination of the magnetic layers was reversed was first made. This sample was applied to a drive device generally used for recording and reproduction on a magneto-optical disc to thereby record repeated magnetic domain patterns of a mark length 0.75 μm. This sample was taken out and was observed from the film surface side, i.e., the first magnetic layer side, by means of a polarization microscope.

A focussed laser for heating was applied to the sample to thereby form a temperature profile substantially similar to the temperature profile indicated by 41 in FIG. 4 in the field of view of the polarization microscope, whereafter the sample was slowly scanned in the direction of the track.

As a result, it was observed that the boundary portion between the magnetic domains formed on the track momentarily moved toward the center of a circular area having a radius of the order of 1 μm supposed to have reached a temperature above Ts each time it entered the circular area. Also, when the application of the laser for heating was stopped, it was observed that the magnetic domain pattern preserved in the third magnetic layer was transferred to the first magnetic layer and returned to its initial state.

From the foregoing, it was confirmed that, in an area which reached a temperature about Ts and had its exchange coupling to the third magnetic layer cut, the magnetic wall of the first magnetic layer was moved by about
1 μm toward the high temperature side by a temperature gradient.

Next, the recording-reproducing characteristic of the magnetic recording medium of the present embodiment was measured.

In a recording-reproducing apparatus used for the measurement, as shown in FIG. 8, a laser for heating is added to the optical system of an ordinary magneto-optical disc recording-reproducing apparatus.

Reference numeral 81 designates a laser source for recording and reproduction, and it has a wavelength of 780 nm and is disposed so that P-polarization may enter the recording medium. Reference numeral 82 denotes a laser source for heating, and it has a wavelength of 1.3 μm and is likewise disposed so that P-polarization may enter the recording medium. Reference numeral 83 designates a dichroic mirror designed to transmit 780 nm light 100% therethrough and reflect 1.3 μm light 100%. Reference numeral 84 denotes a polarizing beam splitter designed to transmit the P-polarization of 780 nm light and 1.3 μm light 70–80% therethrough and reflect the S-polarization thereof 100%. The beam diameter of 1.3 μm light is designed to be smaller than the aperture diameter of an objective lens 85, and NA is designed to be small as compared with 780 nm light passed and condensed through the whole aperture portion. Reference numeral 87 designates a dichroic mirror provided so that 1.3 μm light may not leak into a signal detecting system, and designed to transmit 780 nm light 100% therethrough and reflect 1.3 μm light 100%.

By this optical system, a spot 91 for recording and reproduction and a spot 92 for heating can be imaged on the land 95 between guide grooves 94 on the recording surface of the recording medium 86, as shown in FIG. 9A. The spot 92 for heating is long in wavelength and small in NA and is therefore larger in diameter than the spot 91 for recording and reproduction. Thereby, a desired temperature gradient as shown in FIG. 9B can be easily formed in the area of the spot 91 for recording and reproduction on the recording surface of the moving medium.

Recording and reproduction were effected with the medium driven at linear velocity of 1.5 m/sec.

First, in the cooling process after the medium was heated to above the Curie temperature of the third magnetic layer by modulating the magnetic field at ±200 Oe while DC-applying the laser for recording and reproduction at 4 mW, the repeated patterns of upward magnetization and downward magnetization corresponding to the modulation of the magnetic field was formed. At this time, it is also possible to apply the laser for heating together to thereby reduce the recording power of the laser for recording and reproduction.

The modulation frequency of the recording magnetic field was 5.0 MHz and the repeated patterns of a mark length of 0.15 μm were recorded.

Now, reproduction was effected with the magnetic wall displaced by the temperature profile formed by the laser for heating, and this displacement of the magnetic wall was detected by a change in the plane of polarization of the reflected light of the laser for recording and reproduction by the utilization of the magneto-optical effect.

The power of the laser for recording and reproduction during reproduction was 0.5 mW, and C/N was measured while the laser for heating was applied at the power of 25–50 mW at the same time.

As a result, C/N of 48 dB was obtained irrespective of the power of the laser for heating.

The medium of the present embodiment is a medium which satisfies $$\int_{Ts}^{Tp} \frac{1}{k1(T)} dT > 1.6 \times 10^{-4}$$

and in which the range of the aforedescribed allowed temperature profile is sufficiently wide. Therefore, the margin to the power, intensity distribution and shape of the laser for heating can be secured sufficiently. The margin to the positional relationship between the laser for reproduction and the laser for heating is also wide.

When similar reproduction was effected without the laser for heating being applied, a reproduction signal could not be detected at all. By heating by the laser itself for reproduction of 0.5 mW, the temperature of the medium hardly rises and does not reach the temperature Ts at which the magnetic wall can start to move. Thus, reproduction entirely similar to the conventional reproducing system is effected. In this case, the repeated patterns of a mark length of 0.15 μm which is a high density signal about three times as great as the diffraction limit of the reproducing optical system cannot be detected at all.

Also, in the reproduction by the conventional super-resolving system as proposed, for example, in Japanese Laid-Open Patent Application No. 3-93058, etc., to read out the repeated patterns of a mark length of 0.15 μm, it is necessary to limit the aperture to an equal level, and the quantity of light used effectively is greatly reduced. Therefore, a C/N below 30 dB was only obtained.

[Embodiment 2]

The surface of a substrate was first inverse-sputtered at power of 100 W for five minutes by RF sputtering. Next, an AlN layer as the underlayer was formed to 70 nm. Thereafter, the surface of the substrate was again inverse-sputtered at power of 100 W for five minutes to thereby smooth the surface of the foundation layer. Subsequently, a GdFeCoCr layer as the first magnetic layer was formed to a film thickness (h1) of 50 nm, a DyFeCo layer as the second magnetic layer was formed to a film thickness (h2) of 5 nm, and a TbDyFeCo layer as the third magnetic layer was formed to a film thickness (h3) of 40 nm. Thereafter, an AlN layer as the protective layer was formed to 30 nm, and lastly, Al as a heat sink layer was formed to 50 nm. The Ar gas pressure during the formation of the first magnetic layer was 0.1 Pa, and the Ar gas pressure during the formation of the third magnetic layer was 1.1 Pa. In other aspects, the construction and manufacturing method of Embodiment 2 were similar to those of Embodiment 1.

The composition ratio was adjusted so that each magnetic layer might assume a composition in the vicinity of a compensation composition, and adjustment was made so that the Curie temperature (Tc1) of the first magnetic layer might become 250° C., the Curie temperature (Tc2) of the second magnetic layer might become 100° C., and the Curie temperature (Tc3) of the third magnetic layer might be of the order of 220° C.

The temperature dependency of the interface magnetic wall energy density $\sigma w13$ between the first magnetic layer and the third magnetic layer was measured with a result that the lowest temperature Ts at which $\sigma w13$ became 0 erg/cm² was 110° C.

The temperature dependencies of the saturation magnetization Ms1, magnetic wall coercivity Hw1 and magnetic wall energy density $\sigma 1$ of the first magnetic layer and the saturation magnetization Ms3, magnetic wall coercivity Hw3 and magnetic wall energy density $\sigma 3$ of the third magnetic layer were measured, and from these results of measurement, there were derived $$k1(T)=(2*Ms1*Hw1+\sigma w13/h1)/|d\sigma1/dT|$$

and $$k3(T)=(2*Ms3*Hw3-\sigma w13/h3)/|d\sigma3/dT|.$$

Figure 5:
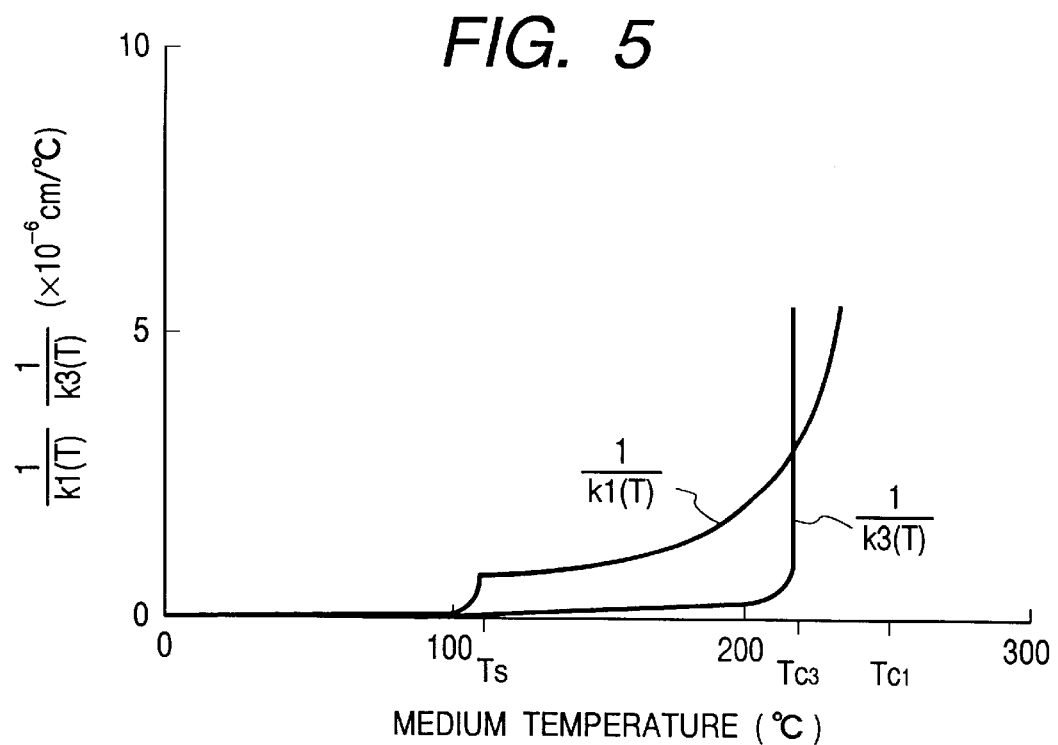
FIG. 5 is a graph showing the temperature dependency of the inverse number of the critical temperature gradient regarding the start of the displacement of the magnetic walls of the first and third magnetic layers in the embodiment.

Taking the inverse of these numbers, the temperature dependencies of $1/k1(T)$ and $1/k3(T)$ are shown in FIG. 5. From FIG. 5, it is seen that when, for example, the temperature Tp is chosen to 180° C., $$k1(T) < k3(T)$$

and $$\int_{T_s}^{T_p} \frac{1}{k1(T)} dT > 0.2 \times 10^{-4}$$

are sufficiently satisfied within a temperature range of at least Ts to Tp.

Also, at least at room temperature, $$2Ms1*Hw1 < \sigma w13/h1$$

and $$2Ms3*Hw3 > \sigma w13/h3$$

were satisfied.

That is, the magnetic recording medium of the present embodiment satisfies the conditions of the magnetic recording medium of claim 1.

In the magnetic recording medium of the present embodiment, Ts and Tp can be chosen to temperatures sufficiently lower than Tc1 and, therefore, the magnetic wall can be moved in a state in which magnetism is sufficiently strong. Therefore, the displacement of the magnetic wall is to be detected by the utilization of the magneto-optical effect, the Kerr angle of rotation is sufficiently great and a great reproducing signal amplitude is obtained.

Also, conversely to Tc1, Tc3 is set to a sufficiently low temperature, and good recording sensitivity is kept in spite of a radiation layer being added to thereby adjust the thermal characteristic.

However, the magnetic wall is displaced at a temperature sufficiently lower than the Curie temperature and, therefore, the material and film forming condition of the first magnetic layer and the limitation to the surface state or the like of the groundwork become severe.

The recording-reproducing characteristic of the magnetic recording medium of the present embodiment was measured by a method similar to that in Embodiment 1 with a result that C/N of 50 dB was obtained.

[Embodiment 3]

After the foundation layer was formed, the first magnetic layer was formed by three layers as described below. A GdFeCr layer of which the Curie temperature (Tc13) was 260° C. as the 13th constituent layer was first formed to a film thickness (h13) of 10 nm. Next, a GdFeCr layer of which the Curie temperature (Tc12) was 210° C. as the 12th constituent layer was formed to a film thickness (h12) of 10 nm. Then a GdFeCr layer of which the Curie temperature (Tc11) was 165° C. as the 11th constituent layer was formed to a film thickness (h11) of 10 nm. Subsequently, the second magnetic layer and the third magnetic layer were formed to film thicknesses similar to those in Embodiment 1 by the use of materials similar to those in Embodiment 1. During the formation of the second magnetic layer and the third magnetic layer, Ar gas pressure was 1.2 Pa and the number of revolutions of the substrate was adjusted so that the film thickness of Tb per period might be of the order of a single atom layer thickness (about 3.7 Å), and there was formed a structure in which the area of rare earth element and the area of chiefly iron group element were periodically repeated in the direction of film thickness. In the other points, the construction and manufacturing method of Embodiment 3 were similar to those of Embodiment 1.

The composition ratio was adjusted so that each magnetic layer might assume composition in the vicinity of the compensation composition. The Curie temperature (Tc2) of the second magnetic layer was adjusted to 145° C., and the Curie temperature (Tc3) of the third magnetic layer was adjusted to 290° C.

The temperature dependency of the interface magnetic wall energy density $\sigma w13$ between the first magnetic layer and the third magnetic layer was measured with a result that the lowest temperature Ts at which $\sigma w13$ was 0 erg/cm² was 145° C.

The temperature dependencies of the saturation magnetization Ms1i, magnetic wall coercivity Hw1i and magnetic wall energy density of the 1i-th constituent layer and the saturation magnetization Ms3, magnetic wall coercivity Hw3 and magnetic wall energy density $\sigma 3$ of the third magnetic layer were measured, and from these results of measurement, $$\sigma 1 = \sum_{i=1}^{n}(\sigma 1i * h1i) \bigg/ \sum_{i=1}^{n} h1i$$

$$Ms1 * Hw1 = \sum_{i=1}^{n}(Ms1i * Hw1i * h1i) \bigg/ \sum_{i=1}^{n} h1i$$

-continued $$hl = \sum_{i=1}^{n} hli$$

were calculated, and $$k1(T)=(2*Ms1*Hw1+\sigma w13/h1)/|d\sigma1/dT|$$

and $$k3(T)=(2*Ms3*Hw3-\sigma w13/h3)/|d\sigma3/dT|$$

were derived.

Figure 6:
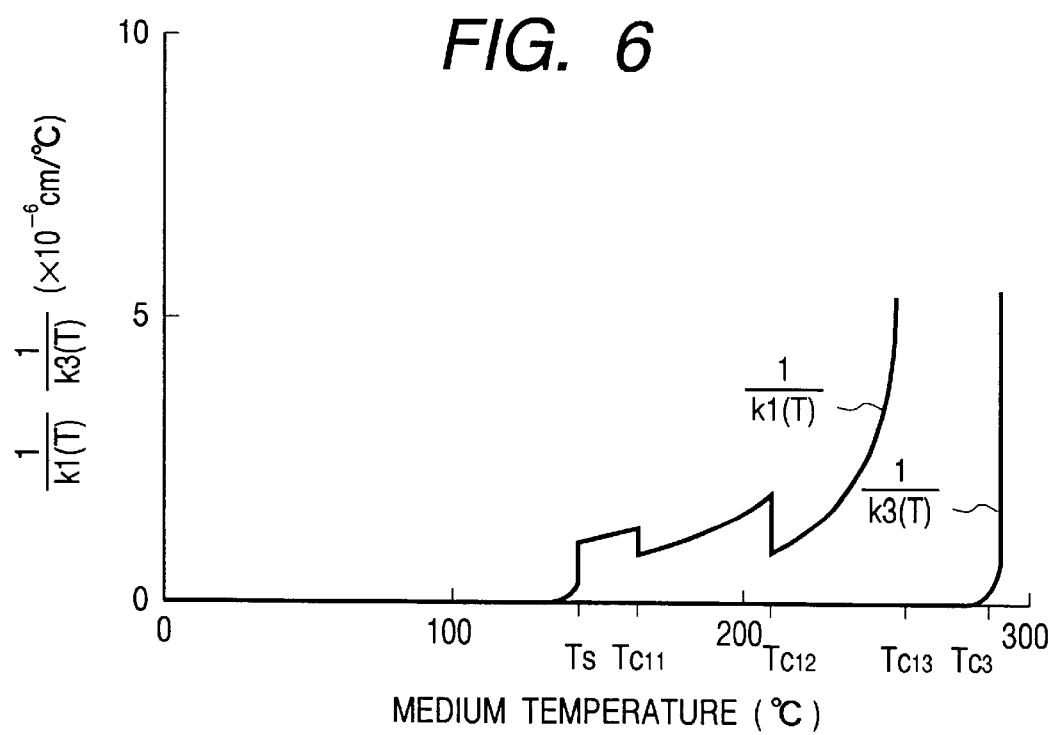
FIG. 6 is a graph showing the temperature dependency of the inverse number of the critical temperature gradient regarding the start of the displacement of the magnetic walls of the first and third magnetic layers in the embodiment.

Taking the inverse numbers of these, the temperature dependencies of 1/k1(T) and 1/k3(T) are shown in FIG. 6. From FIG. 6, it is seen that when for example, the temperature Tp is chosen to 220° C., within a temperature range of at least Ts to Tp, $$k1(T) < k3(T)$$

and $$\int_{Ts}^{Tp} \frac{1}{k1(T)} dT > 0.2 \times 10^{-4}$$

are sufficiently satisfied.

Also, at least at room temperature, $$2Ms1*Hw1 < \sigma w13/h1$$

and $$2Ms3*Hw3 > \sigma w13/h3$$

are satisfied, and

Tc11<Tc12<Tc13 is satisfied.

That is, the magnetic recording medium of the present embodiment satisfies the conditions of a magnetic recording medium prescribed in claim 3.

The recording-reproducing characteristic of the magnetic recording medium of the present embodiment was measured by a method similar to that in Embodiment 1 with a result that C/N of 52 dB was obtained.

In the magnetic recording medium of the present embodiment, Ts and Tp can be chosen as temperatures sufficiently lower than Tc1n and, therefore, when the displacement of the magnetic wall is to be detected by the utilization of the magneto-optical effect, the Kerr angle of rotation is sufficiently great and a great reproducing signal amplitude is obtained. Also, the material and film forming condition of the first magnetic layer and the surface state or the like of the groundwork are not subject to great limitations and productivity is good.

Further, if for example, the film thickness of the 13th constituent layer is kept at 10 nm, and yet the constituent layers of the first magnetic layer are constructed so that the film thickness thereof may become greater toward the second magnetic layer with the film thicknesses of the 12th constituent layer and the 11th constituent layer being 15 nm and 20 nm, respectively, 1/k1(T) on the low temperature side can be made greater. As a result, the margin of the temperature profile allowed during reproduction can be enlarged, or the magnetic wall can be displaced at a higher speed or the displacement distance of the magnetic wall can be increased to thereby improve the detection level.

Also, the second magnetic layer and the third magnetic layer formed periodic structure of a rare earth element single atom layer and an iron group element layer. Generally, it is known that by adopting such structure, the vertical magnetic anisotropy is increased. When the vertical magnetic anisotropy of the second magnetic layer is increased, the magnetic wall energy increases and σw13 in the vicinity of the Curie temperature of the second magnetic layer also increases and, therefore, the signal characteristic is improved as will be described later. When the vertical magnetic anisotropy of the third magnetic layer increases, the preservability of the magnetic domain is improved and recording of higher density becomes possible.

[Embodiment 4]

Magnetic recording mediums similar to Embodiment 1 were made, with the exception that the composition ratio between the iron group element and the rare earth element of the first magnetic layer was changed to thereby variously change the saturation magnetization at room temperature from that of 200 emu/cc in which iron group element sub-lattice magnetization was dominant to that of 300 emu/cc in which rare earth element sub-lattice magnetization was dominant.

The recording-reproducing characteristic of each of the above-described magnetic recording mediums was measured by a method similar to that in Embodiment 1 with a result that relatively good C/N was obtained within a range from that of 50 emu/cc in which iron group element sub-lattice magnetization was dominant to that of 200 emu/cc in which rare earth element sublattice magnetization was dominant. Particularly, C/N of 50 dB or greater was obtained within a range from that of 50 emu/cc to that of 100 emu/cc in which rare earth element sub-lattice magnetization was dominant.

When the temperature dependencies of the saturation magnetization of the first magnetic layers of these samples were measured and the compensation temperatures were examined, the compensation temperature was of the order of 100° C. in the sample of 50 emu/cc in which rare earth element sub-lattice magnetization was dominant, and the compensation temperature suddenly rose with an increase in the saturation magnetization at room temperature, and in the same of 100 emu/cc in which rare earth element sub-lattice magnetization was dominant, the compensation temperature exceeded Curie temperature and therefore became absent. Considering the compensation temperature at Curie temperature or higher exterpolated virtually, the compensation temperatures of the samples of 50 emu/cc to 100 emu/cc in which rare earth element sub-lattice magnetization is dominant are considered to be of the order of 100° C. to 250° C.

Now, Ts of the above-described samples is 160° C. like that of Embodiment 1, and the Curie temperature Tc1 of the first magnetic layer is designed to be adjusted to nearly 220° C. as in Embodiment 1 by adjusting the amount of addition of Cr with a change in the composition ratio between the iron group element and the rare earth element.

The above-mentioned range of the compensation temperature substantially overlaps the range of Ts to Tc1. At the compensation temperature, the saturation magnetization is 0 emu/cc, and also at temperatures about it, the iron group element sub-lattice magnetization and the rare earth element sub-lattice magnetization are substantially compensated for, and the saturation magnetization is suppressed to a minimum magnitude.

From this, it is considered that in the above-mentioned composition range, the saturation magnetization within the temperature range of Ts to Tc1 at which the magnetic wall displaces is small. Therefore, it is difficult for the behavior of the magnetic wall to be effected by the external magnetic field, or the diamagnetic field and noise is suppressed such that good C/N is obtained.

As a result of the actual measurement, the saturation magnetization in the temperature range of Ts to Tc1 of the samples for which C/N of 50 dB or greater was obtained was 20 emu/cc or less.

[Embodiment 5]

A magnetic recording medium similar to Embodiment 1 was made with the exception that the first magnetic layer was formed of an antiferromagnetic material comprising Co—Ni—O.

In the magnetic recording medium of the present embodiment, the saturation magnetization of the first magnetic layer was always 0 emu/cc within the operating temperature range. Therefore, the behavior of the magnetic wall was not affected at all by the external magnetic field or the diamagnetic field. Therefore, even under the application of a reproducing magnetic field of ±400 Oe, a good reproducing signal was always obtained stably.

[Embodiment 6]

A magnetic recording medium similar to Embodiment 1 was made with the exception that the first magnetic layer was formed of GaFeCoCr. The saturation magnetization of the first magnetic layer at room temperature was 250 emu/cc with rare earth element sub-lattice magnetization being dominant, and the Curie temperature thereof was 300° C. or higher.

In the magnetic recording medium of the present embodiment, the first magnetic layer was magnetization-oriented in the surface thereof at room temperature, and was vertically oriented on the high temperature side from a temperature in the vicinity of Ts with a temperature rise.

The vertical magnetic anisotropy of the first magnetic layer was small and, therefore, the magnetic wall was easy to displace and a good signal characteristic was obtained.

[Embodiment 7]

A magnetic recording medium similar to Embodiment 1 was made with the exception that adjacent to the first magnetic layer of the magnetic recording medium of Embodiment 1 and on the opposite side from the second magnetic layer, a fourth layer of NdFeCo as a reproducing layer was added by 10 nm.

In the magnetic recording medium of the present embodiment, when the displacement of the magnetic wall is to be detected by the utilization of the Kerr effect, a magnetic layer formed of a material in which the Kerr angle of rotation at a short wavelength is great is added to the laser incidence side during reproduction. Therefore, the detection level will be improved in the future, when track density is to be improved by the use of a short wavelength laser such as a blue laser.

The fourth magnetic layer added as the reproducing layer is not limited to the above-described one. Use may be made of rare-earth element-iron element amorphous alloy film having light rare earth metals such as Nd, Pr and Sm excellent in the magneto-optical effect added thereto, platinum group-iron group periodic structure film such as Pt/Co, Pd/Co or the like, or a magnetic oxide such as PtMnSb, MnBi, magnetic garnet or ferrite.

Also, in order to obtain a similar effect, a material applicable as such fourth magnetic layer may be used for the first magnetic layer itself.

[Embodiment 8]

Magnetic recording media similar to Embodiment 1 were made with the exception that the composition ratio between the iron group element and the rare earth element of the second magnetic layer was changed to thereby variously change the saturation magnetization at room temperature from that of 300 emu/cc in which the iron group element sub-lattice magnetization was dominant to that of 300 emu/cc in which the rare earth element sub-lattice magnetization was dominant.

The recording-reproducing characteristic of each of the above-described magnetic recording mediums was measured by a method similar to that in Embodiment 1 with a result that good C/N was obtained over a range from that of 200 emu/cc in which the iron group element sub-lattice magnetization was dominant to that of 200 emu/cc in which the rare earth element sub-lattice magnetization was dominant.

That is, when the saturation magnetization of the second magnetic layer is 200 emu/cc or less, good C/N was obtained.

[Embodiment 9]

Magnetic recording mediums which were similar to Embodiment 1 were made with the exception that the second magnetic layer was formed of (GdTb) (FeCoCr) and the Gd composition ratio in (GdTb) was changed to 0–100 atom % and in which the magnetic wall energy density of the second magnetic layer was variously changed. The (GdTb) composition ratio in (GdTb) (FeCoCr) was adjusted so as to become composition in the vicinity of compensation composition, and the Co and Cr composition ratio in (FeCoCr) was adjusted so that Curie temperature might be 160° C. in each sample.

The magnetic wall energy density of the second magnetic layer at room temperature decreased more as the Gd composition ratio in (GdTb) increased, and was 6 erg/cm$^2$ when the Gd composition ratio was 0 atom %, and was 1 erg/cm$^2$ when the Gd composition ratio was 100 atom %.

The recording-reproducing characteristic of each of the above-described magnetic recording mediums was measured by a method similar to that in Embodiment 1 with a result that good C/N was obtained in samples wherein the magnetic wall energy density at room temperature was 4 erg/cm$^2$ or greater (the Gd composition ratio was about 40 atom % or less).

When the magnetic wall energy density of the second magnetic layer is great, σw13 in the vicinity of the Curie temperature of the second magnetic layer also becomes great, and σw13 suddenly lowers toward the Curie temperature of the second magnetic layer. As a result, the fluctuation of the temperature at which the magnetic wall driving force acting on the first magnetic layer exceeds the sum of the frictional force and σw13/h1, i.e., the magnetic wall movement starting temperature, is suppressed. Therefore, noise is reduced and C/N is considered to be improved.

[Embodiment 10]

Magnetic recording mediums similar to Embodiment 1 were made with the exception that the composition ratio between the iron group element and the rare earth element of the third magnetic layer was changed to thereby variously change the saturation magnetization at room temperature from that of 300 emu/cc in which the iron group element sub-lattice magnetization was dominant to that of 300 emu/cc in which the rare earth element sub-lattice magnetization was dominant.

The recording-reproducing characteristic of each of the above-described magnetic recording mediums was measured by a method similar to that in Embodiment 1 with a result that good C/N was obtained over a range from that of 150 emu/cc in which the iron group sub-grating magnetization was dominant to that of 150 emu/cc in which the rare earth element sub-grating magnetization was dominant.

That is, when the saturation magnetization of the third magnetic layer was 150 emu/cc or less, good C/N was obtained.

[Embodiment 11]

Magnetic recording mediums similar to Embodiment 1 were made with the exception that the Co percentage content of the third magnetic layer was variously changed to 10–30 atom %.

The recording-reproducing characteristic of each of the above-described magnetic recording mediums was measured by a method similar to that in Embodiment 1 with a result that good C/N was obtained within a range in which the Co percentage content was 20 atom % or less, but when the Co percentage content was increased above 20 atom %, the mark was missed or the shape of the magnetic domain was disturbed and C/N was reduced. However, to obtain a particularly appropriate Curie temperature so that reproduction does not deteriorate, it is preferable that the Co percentage content be 5 atom % or greater.

[Embodiment 12]

Magnetic recording mediums similar to Embodiment 1 were made with the exception that the film thickness of the third magnetic layer was variously changed to 30–100 nm.

The recording-reproducing characteristic of each of the above-described magnetic recording mediums was measured by a method similar to that in Embodiment 1 with a result that good C/N was obtained for a film thickness of 50 nm or greater. For a film thickness of 70 nm or greater, even when recording was effected at a mark length of 0.10 $\mu$m, the mark was not missed and the shape of the magnetic domain was not disturbed, and better C/N was obtained.

However, too great a thickness is not practical, and particularly to obtain appropriate recording sensitivity, the film thickness is usually 200 nm or less.

[Embodiment 13]

Magnetic recording mediums similar to Embodiment 1 were made with the exception that the sputter gas pressure during the formation of the third magnetic layer was variously changed to 0.1–1.2 Pa.

The recording-reproducing characteristic of each of the above-described magnetic recording mediums was measured by a method similar to that in Embodiment 1 with a result that good C/N was obtained at sputter gas pressure of 0.5 Pa or higher. At sputter gas pressure of 1.0 Pa or higher, even when recording was effected at a mark length of 0.10 $\mu$m, mark was not missed, the shape of the magnetic domain was not disturbed and better C/N was obtained.

However, if the sputter gas pressure is too high, the quality of the film is ready to be deteriorated and the characteristic or the structural stability may be reduced. So, if the sputter gas pressure is 3 Pa or less, mediums particularly excellent in characteristic will be obtained stably.

[Embodiment 14]

Figure 7A:
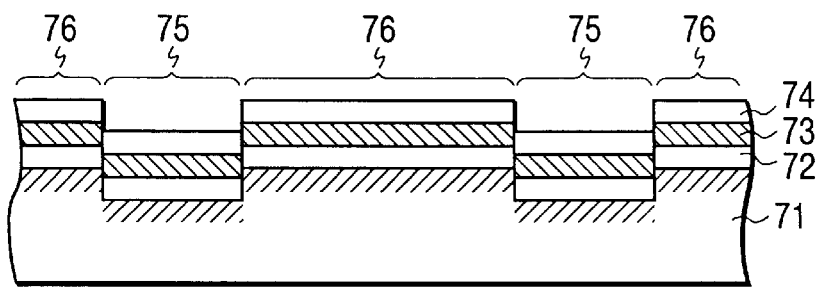
FIGS. 7A and 7B show the cross-sectional shape of the magnetic recording medium in the embodiment, and FIG.

A magnetic recording medium similar to Embodiment 1 was made with the exception that, as shown by a cross-sectional shape in FIG. 7A, use was made of a substrate in which guide grooves 75 as guide zones were formed into a rectangle having a depth of 0.1 $\mu$m.

These rectangular guide grooves 75 are formed as erecting substantially vertically relative to the surface of the substrate. Therefore, a magnetic layer 73 formed on this substrate by the film forming step such as ordinary sputtering or evaporation is substantially separated on the side portions of the guide grooves 75 as shown. Actually, it is considered that film is more or less deposited on a level difference portion and the magnetic layer is connected thereto, but as compared with the other portions, the film thickness becomes very small. Therefore, the coupling in the level difference portion can be ignored.

Figure 7B:
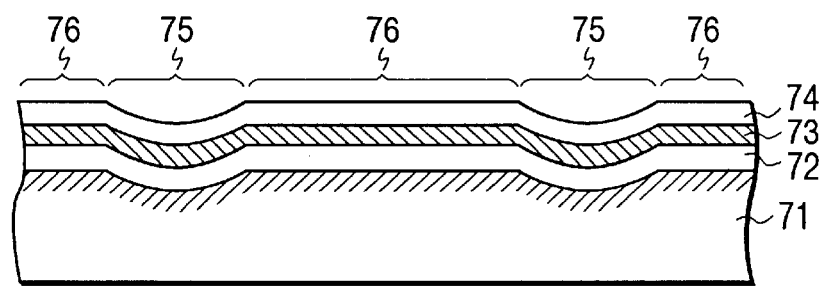

In the conventional substrate used in Embodiment 1, as shown in FIG. 7B, the magnetic layer 73 is continuously and uniformly deposited between the guide grooves 75 and, lands 76 and therefore, the magnetic layers are connected together between tracks.

Figure 7C:
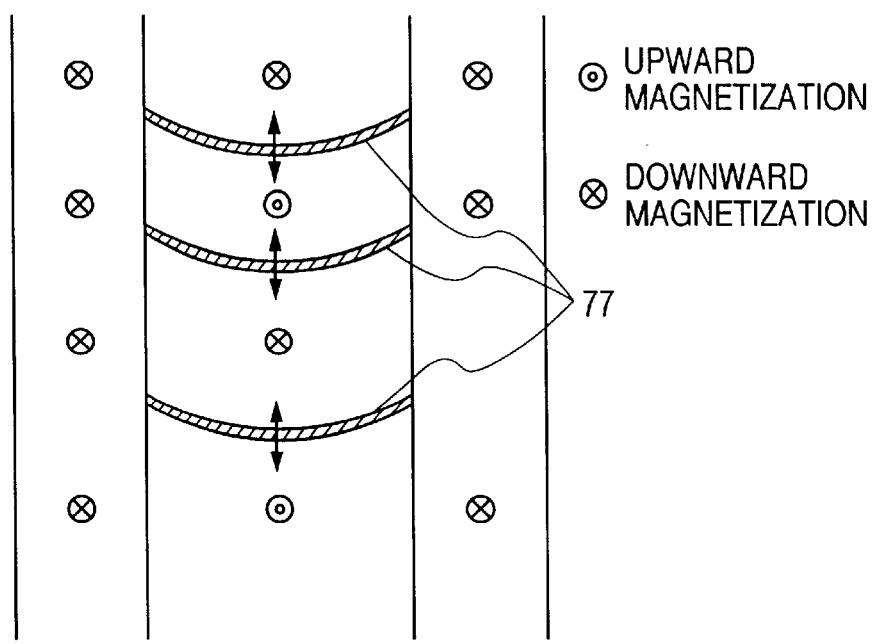

When a reversing magnetic domain is formed fully over the width of the land with the lands 76 of the magnetic recording medium of the present embodiment as recording tracks, magnetic walls 77 which are not closed are formed in the boundary portion between the magnetic domains on the lands 76, as shown in FIG. 7C. Such magnetic walls 77 can be stably and easily moved because even if they are moved in the direction of the track, appearance and disappearance the magnetic walls do not occur on the side portion of the track. As a result, the noise during reproduction was reduced and good C/N was obtained.

The magnetic recording medium of the present embodiment can also use the guide grooves 75 as recording tracks in addition to the lands 76.

[Embodiment 15]

A magnetic recording medium similar to Embodiment 1 was made with the exception that as shown by a cross-sectional shape in FIG. 10, use was made of a substrate in which guide grooves 101 as guide zones were formed to a depth of 0.4 $\mu$m and a width of 0.3 $\mu$m on the surface of the substrate.

These guide grooves are very great in depth relative to the width thereof. Therefore, recording film 103 formed on this substrate by the film forming step such as ordinary sputtering or evaporation is hardly deposited on the bottoms of the guide grooves, as shown.

With the lands 102 of the magnetic recording medium of the present embodiment as recording tracks, a recording mark was formed astride the recording tracks and the guide zones on both sides, whereafter reproduction was effected in a manner similar to that in Embodiment 1, with a result that the noise during the reproduction was reduced and good C/N was obtained.

[Embodiment 16]

A focussed laser beam for recording and reproduction was continuously applied to the magnetic recording medium of Embodiment 1 at 14 mW while tracking servo was applied onto the guide grooves (guide zones) of the medium and the medium was driven at linear velocity of 1.5 m/sec., whereby only the magnetic film on the guide grooves was locally annealed.

A recording mark corresponding to information was formed astride the recording track of the magnetic recording medium of the present embodiment and the guide zones on both sides, whereafter reproduction was effected in a manner similar to that in Embodiment 1 with a result that the noise during the reproduction was reduced and good C/N was obtained.

Changes in the magnetic characteristic of the magnetic film were examined with respect to a sample in which magnetic film formed on a glass substrate was generally annealed by a heating furnace. As a result, the magnetic wall energy density was greatly reduced by the high-temperature annealing process.

From this result, it is considered that, in the magnetic recording medium of the present embodiment, the magnetic wall energy density of the magnetic film on the guide grooves is greatly lower than the magnetic wall energy density of the magnetic film on the recording track.

In embodiments 14 to 16, simultaneously with the first magnetic layer, a magnetic wall not closed is also formed on the third magnetic layer and magnetic walls before and behind the recording mark are independently formed. Therefore, it was found that the action of shrinking the magnetic domain became null and a minute magnetic domain could be preserved, and a recording mark of higher density could be formed.

[Embodiment 17]

The recording-reproducing characteristic of the magnetic recording medium of Embodiment 1 was measured by the use of a conventional magneto-optical disc evaluating apparatus. The measuring conditions are the same as the measuring conditions of embodiment 1, with the exception that the laser for heating is absent.

Repeated patterns of a mark length of 0.15 μm were recorded, and were heated and reproduced by the laser for reproduction itself. When the power of the laser for reproduction was changed from 0.5 mW to 3.0 mW, a signal waveform appeared from 1.2 mW and C/N of 40 dB or greater was obtained within a range over 2.0 mW. Over 2.6 mW, data were destroyed.

When the patterns are heated by the laser for reproduction itself, a peak of temperature profile is usually formed in an applied spot on the surface of the medium. Isothermal lines of temperature Ts are formed forwardly and rearwardly of the applied spot. As a result, the movement of the magnetic wall respectively from the forward and rearward isothermal lines of temperature Ts to the peak temperature position are superposed and are detected by a reproducing spot. Therefore, the noise of the reproducing signal becomes high.

However, when the reproducing power is raised and the temperature of the area around the peak of the formed temperature profile is made equal to or higher than a temperature in the vicinity of the Curie temperature of the first magnetic layer, the magnetic wall does not move to the area around the peak, or if it moves, the movement can be made to not be detected because magnetism has become nearly null.

If a heating-reproducing spot moves relative to the medium, heat is accumulated more rearwardly of the heating-reproducing spot. Therefore, the peak of temperature profile is formed at a position in the heating-reproducing spot which is rearwardly eccentric with respect to the center.

Thereby, as shown in FIG. 11, the movement of the magnetic wall from the isothermal line of temperature Ts rearward of the reproducing spot can be masked by the area around the peak heated to above a temperature in the vicinity of the Curie temperature of the first magnetic layer, and only the movement of the magnetic wall from the isothermal line of temperature Ts forward of the reproducing spot can be detected.

As a result, in the present embodiment, a relatively good reproducing signal was obtained within a range of reproducing power of 2.0 mW or greater.

In the present embodiment, it can be verified more clearly by the reproduction of the following isolation mark that the mask function as described above is acting within the range of reproducing power of 2.0 mW or greater.

A mark of 0.75 μm was recorded at a period of 4.5 μm, and was reproduced with the power of the laser for reproduction changed from 1.0 mW to 2.2 mW. Signal waveforms observed on the oscilloscope at this time are shown in FIGS. 12A to 12D.

Figure 12A:
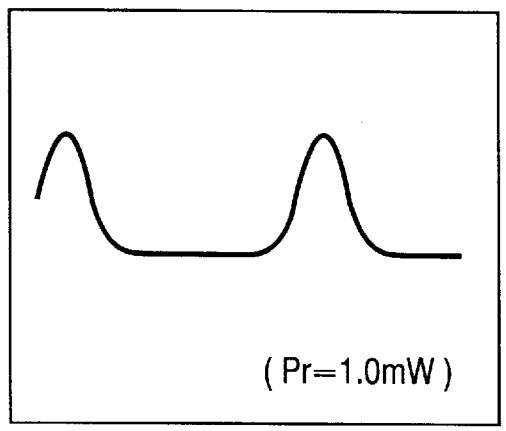

At the reproducing power of 1.0 mW, the temperature Ts at which the movement of the magnetic wall can start is not reached, but reproduction similar to the conventional reproducing system is effected. As shown in FIG. 12A, an isolation mark of a period of 4.5 μm is also sufficiently reproducible by the conventional reproducing system and, therefore, an ordinary reproducing waveform is observed.

Figure 12B:
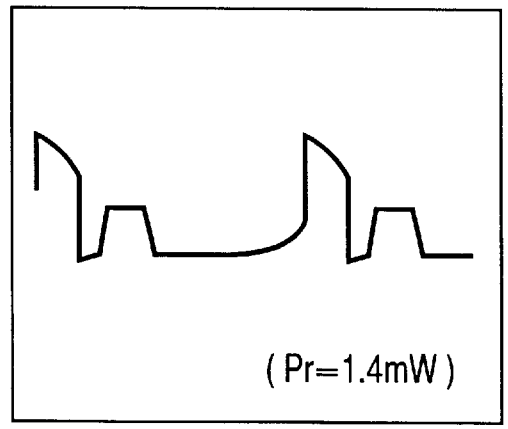

When the reproducing power was raised to 1.4 mW, an area was formed which reached the temperature Ts or higher, and as shown in FIG. 12B, a rectangular waveform peculiar to the reproducing system of the present invention by the movement of the magnetic wall appeared. At this time, two rectangular waveforms of different amplitudes were observed at a time with a predetermined delay.

The rectangular waveform of greater amplitude is a signal waveform by the movement of the magnetic wall from the isothermal line of the temperature Ts formed forwardly in the direction of movement of the reproducing spot, and the rectangular waveform of smaller amplitude is a signal waveform by the movement of the magnetic wall from the rearward isothermal line of the temperature Ts. Since the peak of the temperature profile which is the terminal of the movement of the magnetic wall is formed at a position rearwardly eccentric with respect to the center of the reproducing spot, the signal waveform by the movement of the magnetic wall from the rearward isothermal line of the temperature Ts becomes small in amplitude. The rising of each signal waveform is a change in the signal level by the movement of the magnetic wall in front of the recording mark, and the falling of each signal waveform is a change in the signal level by the movement of the magnetic wall in the rear of the recording mark. It is because the forward isothermal line of the temperature Ts is formed within the reproducing spot and therefore the magnetized state before the movement of the magnetic wall is started is also detected that the rising and falling of the signal ahead are dull.

Figure 12C:
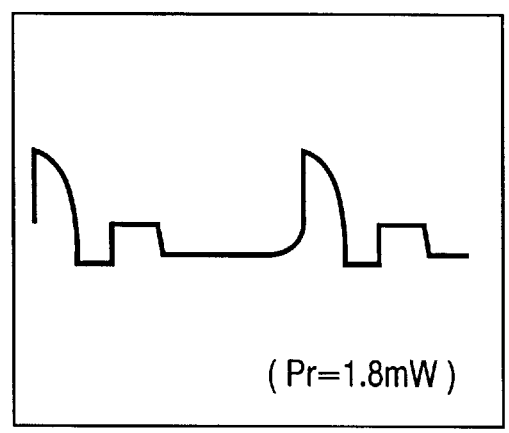
Figure 12D:
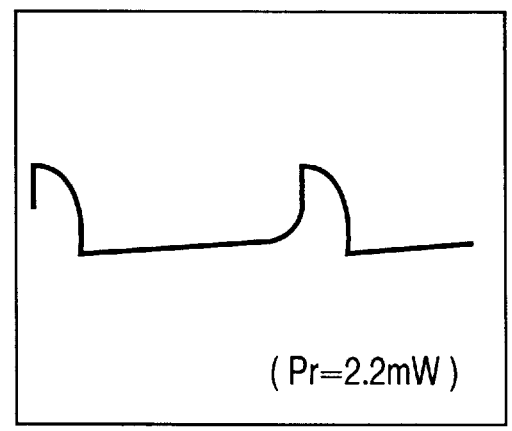

Now, when the reproducing power was raised to 1.8 mW, the area which reached the temperature Ts or higher was enlarged and the distance between the forward and rearward isothermal lines of Ts extended and, therefore, the time interval at which the magnetic wall before movement arrived at each position also extended, and as shown in FIG. 12C, the delay time between the time rectangular waveforms increased. However, the two rectangular waveforms remained observed.

However, when the reproducing power was raised 2.2 mW, no rectangular waveform of small amplitude became unseen and only the movement of the magnetic wall from the forward isothermal line of Ts became detectable.

As described above, an area was formed that was heated to above a temperature in the vicinity of the Curie temperature of the first magnetic layer, whereby the movement of the magnetic wall from the isothermal line of the temperature Ts rearward of the laser spot was masked. As a result, a good reproducing signal could be obtained even if reproduction was effected by a single beam provided by using a common laser beam as the laser for reproduction and the laser for heating.

In this case, however, in order not to destroy data, use needed to be made of a magnetic recording medium in which the Curie temperature of the third magnetic layer was higher than the Curie temperature of the first magnetic layer.

Besides the above-described embodiments, the magnetic recording medium of the present invention and the reproducing method therefor may be ones which detect not only a change in the plane of polarization by the magneto-optical effect, but another change caused by the movement of the magnetic wall to thereby reproduce. The recording film of the magnetic recording medium of the present invention, if it is a magnetic material, need not be a vertically magnetized film. Also, the interface of each magnetic layer need not always be clearly steep, but may be of a construction in which the characteristic gradually varies in the direction of film thickness.

As described above in detail, according to the present invention, a signal of high density can be reproduced without being limited by optical diffraction limitation. Also, by the medium being appropriately prescribed, the operation margin as a recording-reproducing system can be widened.

Also, according to the present invention, the operation can be stabilized to thereby suppress noise and increase the detection level and improve the quality of the reproducing signal.

Further, it is made possible to displace the magnetic wall at a high speed, and the recording-reproducing speed can be improved.

Furthermore, according to the present invention, the productivity of the medium and a recording-reproducing apparatus therefor can be improved and the lower costs thereof can be realized.

What is claimed is:

1. A magnetic recording medium comprising first, second and third magnetic layers laminated in succession,
   wherein when (1) the magnetic wall energy density, saturation magnetization, magnetic wall coercivity and film thickness of the first magnetic layer at a temperature T represented by cgs unit system are defined as $\sigma 1$, $Ms1$, $Hw1$ and $h1$, respectively, (2) the magnetic wall energy density, saturation magnetization, magnetic wall coercivity and film thickness of the third magnetic layer are defined as $\sigma 3$, $Ms3$, $Hw3$ and $h3$, respectively, (3) the interface magnetic wall energy density between the first magnetic layer and the third magnetic layer is defined as $\sigma w13$, and (4) the lowest temperature at which $\sigma w13$ is 0 erg/cm$^2$ is Ts, $$2Ms1*Hw1<\sigma w13/h1$$

and $$2Ms3*Hw3>\sigma w13/h3$$

are satisfied at room temperature, and
   when a suitable temperature Tp is chosen within a temperature range greater than the temperature Ts and lower by 10° C. or more than the Curie temperature Tc1 of the first magnetic layer,
   within a temperature range of about Ts to Tp, $$k1(T) < k3(T)$$

and $$\int_{Ts}^{Tp} \frac{1}{k1(T)} dT > 0.2 \times 10^{-4}$$

are satisfied,
   where $$k1(T)=(2Ms1*Hw1+\sigma w13/h1)/|d\sigma 1/dT|$$

$$k3(T)=(2Ms3*Hw3-\sigma w13/h3)/|d\sigma 3/dT|.$$

2. A magnetic recording medium according to claim 1, wherein said temperature Tp is chosen within a temperature range lower by 20° C. or more than the Curie temperature of the first magnetic layer.

3. A magnetic recording medium comprising first, second and third magnetic layers laminated in succession, said first magnetic layer being comprised of n constituent layers comprising a 11th constituent layer, a 12th constituent layer, ..., a 1n-th constituent layer laminated in succession, wherein when the interface magnetic wall energy density between said first magnetic layer and said third magnetic layer is defined as $\sigma w13$ and the lowest temperature at which $\sigma w13$ is 0 erg/cm$^2$ is Ts, $$Tc11<Tc12<\ldots<Tc1n$$

is satisfied, and $$2Ms1*Hw1<\sigma w13/h1$$

and $$2Ms3*Hw3>\sigma w13/h3$$

are satisfied at room temperature, and
   when a suitable temperature Tp is chosen within a temperature range greater than the temperature Ts and lower by 10° C. or more than the Curie temperature Tc1n of said 1n-th constituent layer,
   within a temperature range of about Ts to Tp, $$k1(T) < k3(T)$$

and $$\int_{Ts}^{Tp} \frac{1}{k1(T)} dT > 0.2 \times 10^{-4}$$

are satisfied,
   where the Curie temperature of the 1i-th constituent layer is Tc1i and the magnetic wall energy density, saturation magnetization, magnetic wall coercivity and film thickness at a temperature T represented by cgs unit system are defined as $\sigma 1i$, $Ms1i$, $Hw1i$ and $h1i$, respectively (where i represents one of integers 1 to n), $$\sigma 1 = \sum_{i=1}^{n}(\sigma 1i*h1i) \bigg/ \sum_{i=1}^{n} h1i$$

$$Ms1*Hw1 = \sum_{i=1}^{n}(Ms1i*Hw1i*h1i) \bigg/ \sum_{i=1}^{n} h1i$$

$$h1 = \sum_{i=1}^{n} h1i$$

and where the magnetic wall energy density, saturation magnetization, magnetic wall coercivity and film thickness of the third magnetic layer are defined as $\sigma 3$, $Ms3$, $Hw3$ and $h3$, respectively, $$k1(T)=(2Ms1*Hw1+\sigma w13/h1)/|d\sigma 1/dT|$$

$$k3(T)=(2Ms3*Hw3-\sigma w13/h3)/|d\sigma 3/dT|.$$

4. A magnetic recording medium according to claim 1, wherein the Curie temperature Tc1 of the first magnetic layer is lower than the Curie temperature Tc3 of the third magnetic layer.

5. A magnetic recording medium according to claim 3, wherein the Curie temperature Tc1n of the 1n-th constituent layer is lower than the Curie temperature Tc3 of the third magnetic layer.

6. A magnetic recording medium according to claim 3, wherein h11≧h12≧ . . . ≧h1n is satisfied.

7. A magnetic recording medium according to claims 1 or 3, wherein the first magnetic layer is formed of a material exhibiting a magneto-optical effect.

8. A magnetic recording medium according to claim 3, wherein the 1n-th constituent layer is formed of a material exhibiting a magneto-optical effect.

9. A magnetic recording medium according to claims 1 or 3, wherein adjacent to the first magnetic layer, and on the opposite side from the second magnetic layer, a fourth magnetic layer exhibiting a magneto-optical effect is added as a readout layer.

10. A magnetic recording medium according to claims 1 or 3, wherein the first magnetic layer is formed of rare earth-iron group element amorphous alloy which is a composition in which rare earth element sub-lattice magnetization is dominant at room temperature.

11. A magnetic recording medium according to claim 10, wherein the first magnetic layer is formed of rare earth-iron group element amorphous alloy which is a composition in which rare earth element sub-lattice magnetization and iron group element sub-lattice magnetization are substantially compensated for in a temperature range from the vicinity of Ts to the vicinity of Tc1.

12. A magnetic recording medium according to claim 10, wherein the first magnetic layer is formed of a material having GdFeCr as a chief component.

13. A magnetic recording medium according to claim 3, wherein the first magnetic layer is formed of a material having GdFeCr as a chief component, and when the Cr content of the 1i-th constituent layer is X1i atom %, X11>X12> . . . >X1n.

14. A magnetic recording medium according to claims 1 or 3, wherein the first magnetic layer is formed of an antiferromagnetic material.

15. A magnetic recording medium according to claims 1 or 3, wherein the first magnetic layer is formed of a material which becomes an in-plane magnetization film at room temperature and becomes a vertical magnetization film at temperatures above room temperature but below Ts.

16. A magnetic recording medium according to claims 1 or 3, wherein the second magnetic layer is formed of rare earth-iron group element amorphous alloy.

17. A magnetic recording medium according to claim 16, wherein the saturation magnetization of the second magnetic layer at room temperature is 200 emu/cc or less.

18. A magnetic recording medium according to claim 16, wherein the second magnetic layer is formed of a material having chief components selected from the group consisting of Tb, Fe and Co.

19. A magnetic recording medium according to claims 1 or 3, wherein the magnetic wall energy density of the second magnetic layer at room temperature is 4 erg/cm$^2$ or greater.

20. A magnetic recording medium according to claims 1 or 3, wherein the third magnetic layer is formed of rare earth-iron group element amorphous alloy.

21. A magnetic recording medium according to claim 20, wherein the saturation magnetization of the third magnetic layer at room temperature is 150 emu/cc or less.

22. A magnetic recording medium according to claim 20, wherein the third magnetic layer is formed of a material having chief components selected from the group consisting of Tb, Fe and Co.

23. A magnetic recording medium according to claim 22, wherein the Co percentage content of the third magnetic layer is 20 atom % or less.

24. A magnetic recording medium according to claims 1 or 3, wherein the film thickness of the third magnetic layer is 50 nm or greater.

25. A magnetic recording medium according to claims 1 or 3, having recording tracks, and wherein the exchange coupling between said recording tracks in the direction of film surface is reduced in the first magnetic layer.

26. A magnetic recording medium according to claim 25, wherein the magnetic wall energy density of the first magnetic layer between said recording tracks is smaller than the magnetic wall energy density in said recording tracks.

27. A magnetic recording medium according to claim 25, wherein the first magnetic layer is substantially separated between said recording tracks.

28. A magnetic recording medium according to claim 25, wherein the film thickness of the first magnetic layer between said recording tracks is smaller than the film thickness thereof in said recording tracks.

29. A method of recording information on a magnetic recording medium according to claim 25, comprising the step of:
    forming a recording mark corresponding to information on the recording tracks, wherein a width of said recording mark is longer than a width of the recording track.

30. A method of reproducing information recorded on a magnetic recording medium according to claims 1 or 3, comprising the steps of:
    (a) applying a temperature profile forming a temperature gradient G(T) satisfying $$G(T) > k1(T)$$

and $$\int_{Ts}^{Tp'} \frac{1}{G(T)} dT > 0.2 \times 10^{-4}$$

within a temperature range of about Ts to Tp' when a suitable temperature Tp' is chosen within a temperature range greater than said temperature Ts and lower by 10° C. or more than the Curie temperature of said first magnetic layer, and satisfying $$G(T) < k3(T);$$

(b) scanning said temperature profile on the surface of the medium;
    (c) causing a displacement of a magnetic wall in the first magnetic layer toward the high temperature side; and
    (d) detecting the displacement of said magnetic wall.

31. A method according to claim 30, wherein the displacement of the magnetic wall in the first magnetic layer is detected by a magneto-optical effect.

32. A method according to claim 30, wherein the peak temperature of said temperature profile is a temperature in the vicinity of the Curie temperature of the first magnetic layer or the 1n-th constituent layer.

33. A method according to claim 30, wherein said temperature profile is given by applying a laser beam.

34. A method of manufacturing a magnetic recording medium according to claims 1 or 3, comprising the step of:
    sputtering and forming said third magnetic layer under gas pressure of 0.5 Pa or greater.

35. A method according to claim 33, wherein the displacement of the magnetic wall in the first magnetic layer is detected with said laser beam.

36. A method according to claim 35, wherein the peak temperature of said temperature profile is not lower than the Curie temperature of the first magnetic layer or the 1n-th constitutent layer.

37. A magnetic recording medium comprising first, second and third magnetic layers laminated in succession,
wherein when (1) the magnetic wall energy density, saturation magnetization, magnetic wall coercivity and film thickness of the first magnetic layer at a temperature T represented by cgs unit system are defined as $\sigma 1$, $Ms1$, $Hw1$ and $h1$, respectively, (2) the magnetic wall energy density, saturation magnetization, magnetic wall coercivity and film thickness of the third magnetic layer are defined as $\sigma 3$, $Ms3$, $Hw3$ and $h3$, respectively, (3) the interface magnetic wall energy density between the first magnetic layer and the third magnetic layer is defined as $\sigma w13$, and (4) the Curie temperature of the second magnetic layer is defined as Ts, $$2Ms1*Hw1 < \sigma w13/h1$$

and $$2Ms3*Hw3 > \sigma w13/h3$$

are satisfied at room temperature, and
when a suitable temperature Tp is chosen within a temperature range greater than the temperature Ts and lower by 10° C. or more than the Curie temperature Tc1 of the first magnetic layer,
within a temperature range of about Ts to Tp, $$k1(T) < k3(T)$$

and $$\int_{Ts}^{Tp} \frac{1}{k1(T)} dT > 0.2 \times 10^{-4}$$

are satisfied,
where $$k1(T)=(2Ms1*Hw1+\sigma w13/h1)/|d\sigma 1/dT|$$

$$k3(T)=(2Ms3*Hw3-\sigma w13/h3)/|d\sigma 3/dT|.$$

38. A magnetic recording medium comprising first, second and third magnetic layers laminated in succession, said first magnetic layer being comprised of n constituent layers comprising a 11th constituent layer, a 12th constituent layer, . . . , a 1n-th constituent layer laminated in succession, wherein when the interface magnetic wall energy density between said first magnetic layer and said third magnetic layer is defined as $\sigma w13$ and the Curie temperature of the second magnetic layer is defined as Ts, $$Tc11 < Tc12 < \ldots < Tc1n$$

is satisfied, and $$2Ms1*Hw1 < \sigma w13/h1$$

and $$2Ms3*Hw3 > \sigma w13/h3$$

are satisfied at room temperature, and
when a suitable temperature Tp is chosen within a temperature range greater than the temperature Ts and lower by 10° C. or more than the Curie temperature Tc1n of said 1n-th constituent layer,
within a temperature range of about Ts to Tp, $$k1(T) < k3(T)$$

and $$\int_{Ts}^{Tp} \frac{1}{k1(T)} dT > 0.2 \times 10^{-4}$$

are satisfied,
where the Curie temperature of the 1i-th constituent layer is Tc1i and the magnetic wall energy density, saturation magnetization, magnetic wall coercivity and film thickness at a temperature T represented by cgs unit system are defined as $\sigma 1i$, $Ms1i$, $Hw1i$ and $h1i$, respectively (where i represents one of integers 1 to n), $$\sigma 1 = \sum_{i=1}^{n} (\sigma 1i * h1i) / \sum_{i=1}^{n} h1i$$

$$Ms1*Hw1 = \sum_{i=1}^{n} (Ms1i * Hw1i * h1i) / \sum_{i=1}^{n} h1i$$

$$h1 = \sum_{i=1}^{n} h1i$$

and where the magnetic wall energy density, saturation magnetization, magnetic wall coercivity and film thickness of the third magnetic layer are defined as $\sigma 3$, $Ms3$, $Hw3$ and $h3$, respectively, $$k1(T)=(2Ms1*Hw1+\sigma w13/h1)/|d\sigma 1/dT|$$

$$k3(T)=(2Ms3*Hw3-\sigma w13/h3)/|d\sigma 3/dT|.$$

* * * * *

UNITED STATES PATENT AND TRADEMARK OFFICE
CERTIFICATE OF CORRECTION

PATENT NO. : 6,265,062 B1
DATED : July 24, 2001
INVENTOR(S) : Tsutomu Shiratori

It is certified that error appears in the above-identified patent and that said Letters Patent is hereby corrected as shown below:

<u>Title page,</u>
Item [62], Foreign Application Priority Data, "Division of Application No. 08/933,091, filed on Sep. 18, 1992, now Pat. No. 6,265,062" should read -- Division of Application No. 08/933,091, filed Sep. 18, 1997, now Pat No. 6,265,062 --

Signed and Sealed this

Eighteenth Day of May, 2004

JON W. DUDAS
*Acting Director of the United States Patent and Trademark Office*